(12) United States Patent
Qin et al.

(10) Patent No.: US 12,326,639 B2
(45) Date of Patent: *Jun. 10, 2025

(54) DISPLAY PANEL AND DRIVING METHOD THEREOF, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Xianglei Qin, Beijing (CN); Jian Lin, Beijing (CN); Yong Zhang, Beijing (CN); Zhichao Yang, Beijing (CN); Limin Zhang, Beijing (CN); Zepeng Sun, Beijing (CN); Liangzhen Tang, Beijing (CN); Zhilong Duan, Beijing (CN); Honggui Jin, Beijing (CN); Yashuai An, Beijing (CN); Lingfang Nie, Beijing (CN); Jian Wang, Beijing (CN); Xuechao Song, Beijing (CN); Li Tian, Beijing (CN); Jing Pang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,563

(22) Filed: May 30, 2024

(65) Prior Publication Data

US 2024/0310686 A1   Sep. 19, 2024

Related U.S. Application Data

(63) Continuation of application No. 17/755,329, filed as application No. PCT/CN2020/076077 on Feb. 20, 2020, now Pat. No. 12,038,661.

(51) Int. Cl.
*G02F 1/1335* (2006.01)
*G02F 1/1343* (2006.01)
(Continued)

(52) U.S. Cl.
CPC ...... *G02F 1/1368* (2013.01); *G02F 1/136286* (2013.01); *G09G 3/3688* (2013.01);
(Continued)

(58) Field of Classification Search
CPC ............. G02F 1/1333; G02F 1/133345; G02F 1/1335; G02F 1/133514; G02F 1/133555;
(Continued)

(56) References Cited

U.S. PATENT DOCUMENTS 7,250,998 B2   7/2007   Narutaki et al.
12,038,661 B2 *  7/2024   Qin .................. G02F 1/1368

FOREIGN PATENT DOCUMENTS

CN   101126882 A   2/2008
CN   101135786 A   3/2008
(Continued)

OTHER PUBLICATIONS

International Search Report, mailed Nov. 23, 2020, from International App. No. PCT/CN2020/076077, 4 pages.
(Continued)

*Primary Examiner* — Thoi V Duong
(74) *Attorney, Agent, or Firm* — Workman Nydegger

(57) ABSTRACT

Provided are a display panel and a driving method thereof, and a display device. The display panel includes: a base substrate; and multiple subpixels provided at the base substrate, at least one of the multiple subpixels including a
(Continued)

reflective electrode, wherein the reflective electrode at least includes a first reflective electrode and a second reflective electrode insulated and spaced apart from each other, the first reflective electrode is provided with a first through hole, the second reflective electrode is provided with a second through hole, and an area of the first through hole is different from an area of the second through hole.

20 Claims, 21 Drawing Sheets

(51) Int. Cl.
*G02F 1/1362* (2006.01)
*G02F 1/1368* (2006.01)
*G09G 3/36* (2006.01)

(52) U.S. Cl.
CPC .. *G02F 1/133514* (2013.01); *G02F 1/133555* (2013.01); *G09G 2330/021* (2013.01)

(58) Field of Classification Search
CPC ............. G02F 1/1343; G02F 1/134309; G02F 1/1362; G02F 1/136227; G02F 1/136286; G02F 1/1368; G02F 2201/52; G09G 3/3688; G09G 2330/021; G09G 2300/0426

See application file for complete search history.

(56) References Cited

FOREIGN PATENT DOCUMENTS

| CN | 101211056 A | 7/2008 |
|---|---|---|
| CN | 101726938 A | 6/2010 |
| CN | 108828850 A | 11/2018 |
| CN | 110297366 A | 10/2019 |
| KR | 10-2018-0031125 A | 3/2018 |

OTHER PUBLICATIONS

Chinese First Office Action, mailed Feb. 25, 2023, from Chinese App. No. 202080000145.5, 14 pages.
U.S. Non-Final Office Action, mailed Oct. 30, 2023, from U.S. Appl. No. 17/755,329, 15 pages.
U.S. Notice of Allowance, mailed Mar. 8, 2024, from U.S. Appl. No. 17/755,329, 17 pages.

* cited by examiner

DISPLAY PANEL AND DRIVING METHOD THEREOF, AND DISPLAY DEVICE

CROSS REFERENCE TO RELATED APPLICATIONS

The present disclosure is a continuation application of the U.S. patent application Ser. No. 17/755,329, filed on Apr. 27, 2022, which is a US National Stage of International Application No. PCT/CN2020/076077, filed on Feb. 20, 2020, the entire contents of which are incorporated herein by reference.

FIELD

The present disclosure relates to the field of display, in particular to a display panel and a driving method thereof, and a display device.

BACKGROUND

With the continuous development of a display technology, transflective display panels have been widely used in display devices such as mobile phones and tablet computers due to their advantages of low power consumption, high environmental adaptability and the like.

SUMMARY

An embodiment of the present disclosure provides a display panel, including: a base substrate; and a plurality of sub-pixels, disposed on the base substrate, at least one of the plurality of sub-pixels including a reflective electrode; wherein the reflective electrode includes at least a first reflective electrode and a second reflective electrode insulated and spaced apart from each other, the first reflective electrode is provided with a first through hole, the second reflective electrode is provided with a second through hole, and an area of the first through hole is different from an area of the second through hole.

Optionally, in the embodiments of the present disclosure, the base substrate has a first partition and a second partition, an orthographic projection of the first reflective electrode on the base substrate is located in the first partition, and an orthographic projection of the second reflective electrode on the base substrate is located in the second partition; and the display panel further includes: an opposite substrate, disposed opposite to the base substrate; and a color resist layer, located between the base substrate and the opposite substrate, and including a sub-color resist layer located in each sub-pixel; wherein the sub-color resist layer has a first sub-color resist region and a second sub-color resist region, and in a direction perpendicular to a plane where the base substrate is located, the first partition covers the first sub-color resist region, and the second partition covers the second sub-color resist region.

Optionally, in the embodiments of the present disclosure, the first reflective electrode and the sub-color resist layer located in the first sub-color resist region have a first facing area; the second reflective electrode and the sub-color resist layer located in the second sub-color resist region have a second facing area; and in the same sub-pixel, the first facing area is different from the second facing area.

Optionally, in the embodiments of the present disclosure, in the same sub-pixel, an area of the first reflective electrode and an area of the second reflective electrode are approximately the same, and an area of the first sub-color resist region is smaller than an area of the second sub-color resist region.

Optionally, in the embodiments of the present disclosure, the sub-color resist layer located in the first partition is provided with a first via hole, and the first via hole penetrates through the sub-color resist layer; and an orthographic projection of the first via hole on the base substrate and an orthographic projection of the first through hole on the base substrate do not overlap.

Optionally, in the embodiments of the present disclosure, the plurality of sub-pixels include a first-color sub-pixel, a second-color sub-pixel, and a third-color sub-pixel; an area of a first via hole in the second-color sub-pixel is greater than an area of a first via hole in the first-color sub-pixel; and/or, the area of the first via hole in the first-color sub-pixel is greater than an area of a first via hole in the third-color sub-pixel.

Optionally, in the embodiments of the present disclosure, the first-color sub-pixel has a first side and a second side opposite to each other; the first side and the second side are arranged in a first direction; the first via hole in the first-color sub-pixel includes a first sub-via hole and a second sub-via hole; the first sub-via hole is located on the first side, and the second sub-via hole is located on the second side; and/or, the second-color sub-pixel has a third side and a fourth side opposite to each other; the third side and the fourth side are arranged in the first direction; an orthographic projection of the first via hole in the second-color sub-pixel on the base substrate extends from the third side to the fourth side; and/or, the third-color sub-pixel has a fifth side and a sixth side opposite to each other; the fifth side and the sixth side are arranged in the first direction; the first via hole in the third-color sub-pixel includes a third sub-via hole and a fourth sub-via hole; and the third sub-via hole is located on the fifth side, and the fourth sub-via hole is located on the sixth side.

Optionally, in the embodiments of the present disclosure, an area of the first sub-via hole and an area of the second sub-via hole are approximately the same; and/or, an area of the third sub-via hole and an area of the fourth sub-via hole are approximately the same.

Optionally, in the embodiments of the present disclosure, a center of the first via hole in the first-color sub-pixel, a center of the first via hole in the second-color sub-pixel, and a center of the first via hole in the third-color sub-pixel are arranged on the same straight line in the first direction.

Optionally, in the embodiments of the present disclosure, in the same sub-pixel, an area of the first reflective electrode is smaller than an area of the second reflective electrode, and an area of the first sub-color resist region is smaller than or approximately equal to an area of the second sub-color resist region.

Optionally, in the embodiments of the present disclosure, the display panel further includes: a first planarization layer, located between a layer where the reflective electrode is located and the base substrate; a source conductive layer, located between the first planarization layer and the base substrate, and including a plurality of data lines disposed at intervals; a gate insulating layer, located between the source conductive layer and the base substrate; and a gate conductive layer, located between the gate insulating layer and the base substrate, and including a plurality of first gate lines and a plurality of second gate lines disposed at intervals; and the display panel further includes: a plurality of first transistors and a plurality of second transistors disposed at intervals; wherein an orthographic projection of one first transistor on the base substrate is located in one first partition, and an orthographic projection of one second transistor on the base substrate is located in one second partition; gates of the first transistors in one row of sub-pixels are electrically connected to the same first gate line; gates of the second transistors in one row of sub-pixels are electrically connected to the same second gate line; first electrodes of the first transistors and first electrodes of the second transistors in one column of sub-pixels are electrically connected to the same data line; in the same first partition, a second electrode of the first transistor is electrically connected to the first reflective electrode; and in the same second partition, a second electrode of the second transistor is electrically connected to the second reflective electrode.

Optionally, in the embodiments of the present disclosure, the orthographic projection of the first through hole on the base substrate does not overlap orthographic projections of the source conductive layer and the gate conductive layer on the base substrate respectively; and an orthographic projection of the second through hole on the base substrate does not overlap the orthographic projections of the source conductive layer and the gate conductive layer on the base substrate respectively.

Optionally, in the embodiments of the present disclosure, the gate conductive layer further includes a plurality of third gate lines disposed at intervals; the display panel further includes: a plurality of third transistors disposed at intervals; an orthographic projection of one third transistor on the base substrate is located in one sub-pixel; gates of the third transistors in one row of sub-pixels are electrically connected to the same third gate line; and in the same sub-pixel, the first transistor and the second transistor are electrically connected to a source connection portion through the third transistor.

Optionally, in the embodiments of the present disclosure, the source conductive layer further includes: a plurality of source connection portions; and the source connection portions include: first sub-source connection portions and second sub-source connection portions electrically connected to each other; wherein the first sub-source connection portions extend in the first direction, and the second sub-source connection portions extend in a second direction; and the first sub-source connection portions are electrically connected to the data lines, and the second sub-source connection portions are electrically connected to the third transistors.

Optionally, in the embodiments of the present disclosure, an orthographic projection of a first sub-through hole on the base substrate is located between an orthographic projection of the first sub-source connection portions on the base substrate and an orthographic projection of the data lines on the base substrate, and the orthographic projection of the first sub-through hole on the base substrate is located between an orthographic projection of the second sub-source connection portions on the base substrate and an orthographic projection of the third gate lines on the base substrate.

Optionally, in the embodiments of the present disclosure, the display panel further includes: a transparent conductive layer, located on a side of the reflective electrode facing away from the base substrate; the transparent conductive layer includes a plurality of first sub-transparent conductive portions disposed at intervals; an orthographic projection of one first sub-transparent conductive portion on the base substrate is located in one first partition; and in the same first partition, the orthographic projection of the first sub-transparent conductive portion on the base substrate covers the orthographic projection of the first through hole on the base substrate, and the orthographic projection of the first sub-transparent conductive portion on the base substrate is located within the orthographic projection of the first reflective electrode on the base substrate.

Optionally, in the embodiments of the present disclosure, the transparent conductive layer includes a plurality of second sub-transparent conductive portions disposed at intervals; an orthographic projection of one second sub-transparent conductive portion on the base substrate is located in one second partition; and in the same second partition, the orthographic projection of the second sub-transparent conductive portion on the base substrate covers the orthographic projection of the second through hole on the base substrate, and the orthographic projection of the second sub-transparent conductive portion on the base substrate is located within the orthographic projection of the second reflective electrode on the base substrate.

An embodiment of the present disclosure further provides a display device, including the above-mentioned display panel.

An embodiment of the present disclosure further provides a driving method of the display panel, including: driving a row of sub-pixels in each data input stage of one frame of time; wherein driving the row of sub-pixels in one data writing stage, includes: loading a gate opening signal on a first gate line electrically connected to the row of sub-pixels, loading a gate closing signal on a second gate line electrically connected to the row of sub-pixels, and loading a data signal on each data line so as to make a first reflective electrode in the row of sub-pixels input the data signal; and loading the gate closing signal on the first gate line electrically connected to the row of sub-pixels, loading the gate opening signal on the second gate line electrically connected to the row of sub-pixels, and loading the data signal on each data line so as to make a second reflective electrode in the row of sub-pixels input the data signal.

Optionally, in the embodiments of the present disclosure, while loading the gate opening signal on the first gate line electrically connected to the row of sub-pixels, the method further includes: loading the gate opening signal on a third gate line electrically connected to the row of sub-pixels; and/or, while loading the gate opening signal on the second gate line electrically connected to the row of sub-pixels, the method further includes: loading the gate opening signal to the third gate line electrically connected to the row of sub-pixels.

DETAILED DESCRIPTION OF THE EMBODIMENTS

Figure 1:
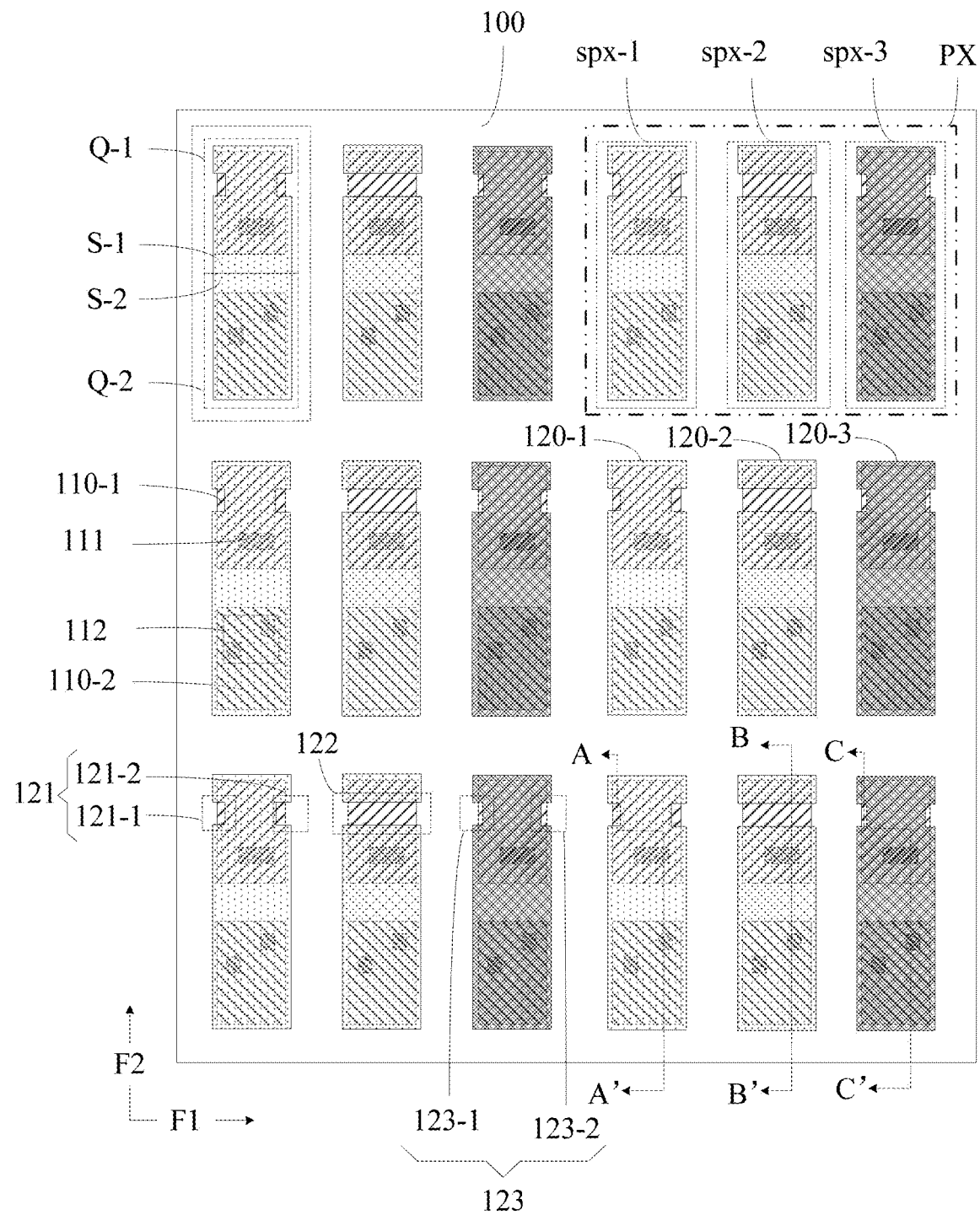
FIG. 1 is a schematic diagram of some top-view structures of a display panel provided by an embodiment of the present disclosure.

In order to make the objectives, technical solutions, and advantages of embodiments of the present disclosure clearer, the technical solutions of the embodiments of the present disclosure will be described clearly and completely with reference to the accompanying drawings of the embodiments of the present disclosure. Apparently, the described embodiments are some, but not all, embodiments of the present disclosure. Under the condition of no conflict, the embodiments in the present disclosure and the features in the embodiments can be combined with each other. Based on the described embodiments of the present disclosure, all other embodiments attainable by those ordinarily skilled in the art without involving any inventive effort are within the protection scope of the present disclosure.

Unless defined otherwise, technical terms or scientific terms used in the present disclosure shall have the ordinary meaning as understood by those ordinarily skilled in the art to which the present disclosure belongs. The "first", "second" and similar words used in the present disclosure do not indicate any order, quantity or importance, but are only used to distinguish different components. The word "include" or "comprise", and other similar words mean that a component or an article that precedes the word is inclusive of the component or article listed after the word and equivalents thereof, but does not exclude other components or articles. Similar words such as "connection" or "connected" are not limited to physical or mechanical connections, but may include electrical connections, whether direct or indirect.

It should be noted that dimensions and shapes of various figures in the drawings are not to truly scale and are intended to be merely illustrative of the present disclosure. The same or similar reference numerals refer to the same or similar components or components having the same or similar functions throughout.

Generally, a display region of a transflective display panel may be divided into a reflective region and a transmission region. When external ambient light is strong, the external ambient light is reflected by the reflective region to provide a light source for the transflective display panel, so that an image is displayed. In an environment with no external light or weak light, a backlight source in the transflective display panel works, and light emitted from the backlight source passes through the transmission region to provide a light source for the transflective display panel so as to display the image.

Figure 2A:
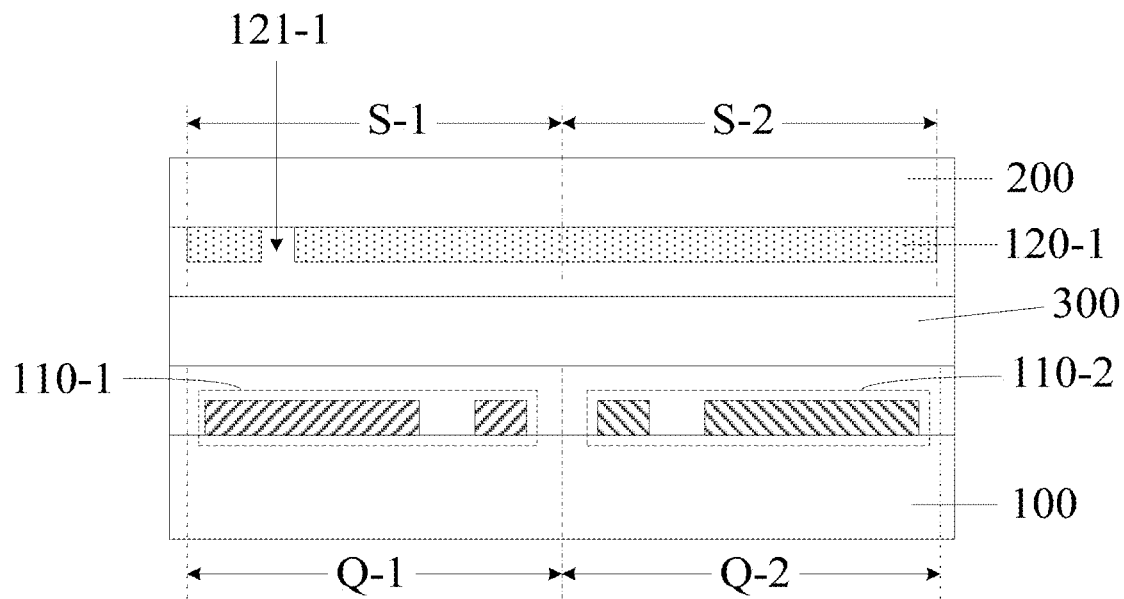
FIG. 2A is a schematic diagram of a cross-sectional structure of the display panel shown in FIG. 1 in an AA' direction.
Figure 2B:
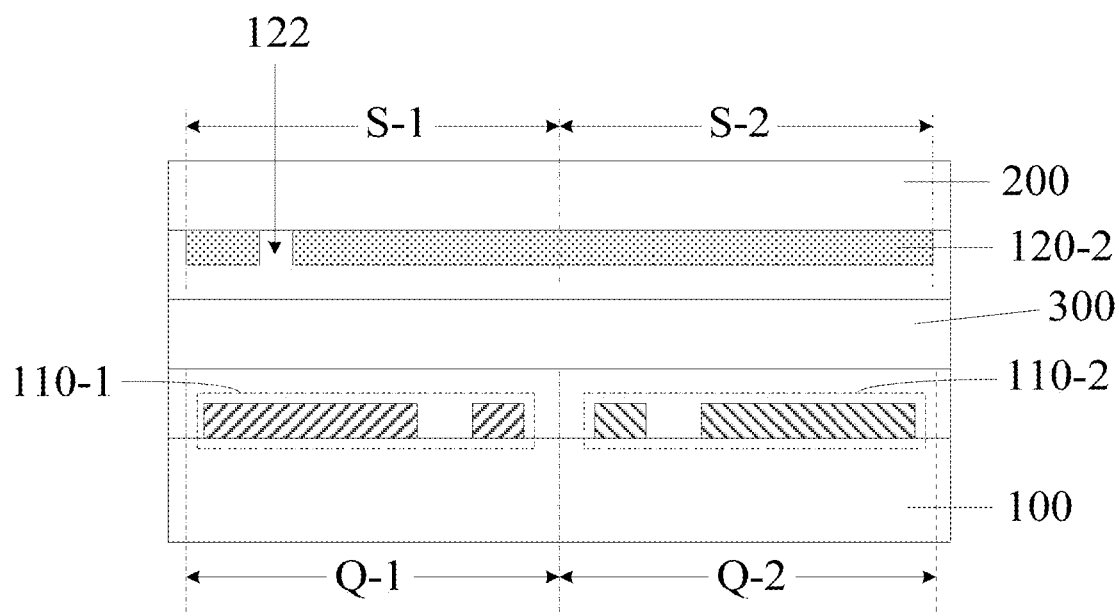
FIG. 2B is a schematic diagram of a cross-sectional structure of the display panel shown in FIG. 1 in a BB' direction.
Figure 2C:
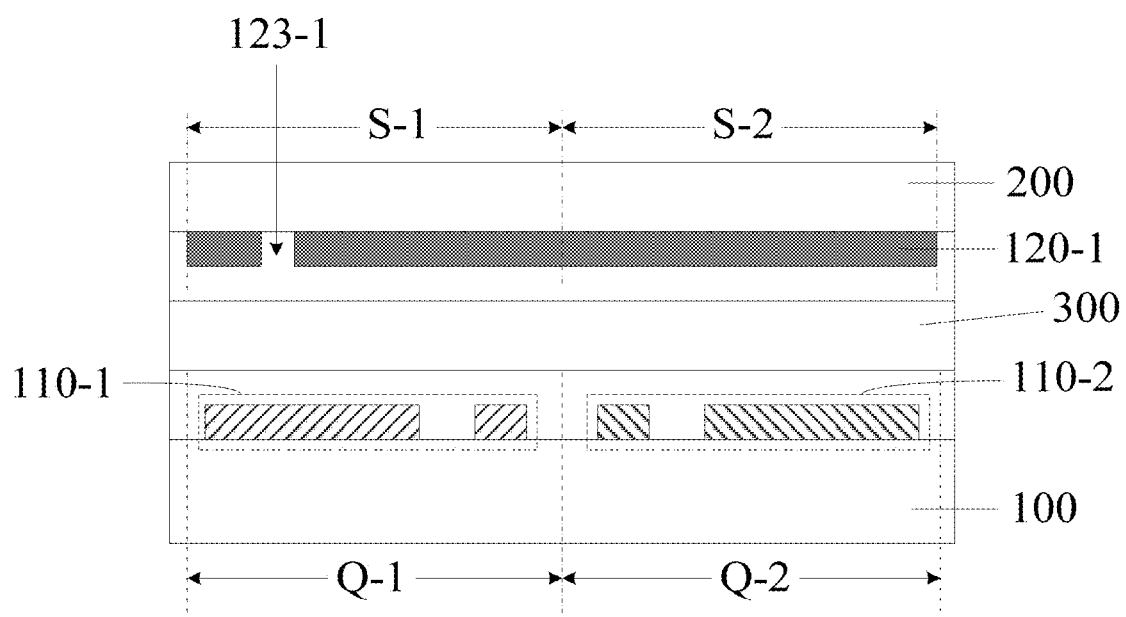
FIG. 2C is a schematic diagram of a cross-sectional structure of the display panel shown in FIG. 1 in a CC' direction.

An embodiment of the present disclosure provides a display panel, as shown in FIG. 1 to FIG. 2C. The display panel include: a base substrate 100 and a plurality of sub-pixels disposed on the base substrate 100. At least one of the plurality of sub-pixels may include a reflective electrode. The reflective electrode includes at least a first reflective electrode 110-1 and a second reflective electrode 110-2 insulated and spaced apart from each other. The first reflective electrode 110-1 is provided with a first through hole 111. The second reflective electrode 110-2 is provided with a second through hole 112. An area of the first through hole 111 is different from an area of the second through hole 112. It should be noted that the through holes may be configured to transmit backlight; and the reflective electrode may be configured to reflect the light incident on the reflective electrode. Of course, the through holes and the reflective electrode may also implement other functions in the display panel, which is not limited herein.

In the above-mentioned display panel provided by the embodiments of the present disclosure, the sub-pixels are provided with partitions, the reflective electrodes are disposed in the partitions, and the through holes are disposed in the reflective electrodes. When external ambient light is strong, the display panel may be in a reflective mode, so that the external ambient light may be reflected by the reflective electrodes to provide a light source for the display panel, the display panel displays an image, and at this time, a backlight source may be turned off to reduce power consumption. In an environment with no external light or weak light, the display panel may be in a transmission mode, and by operating the backlight source, light emitted from the backlight source passes through the through holes in the reflective electrodes to provide a light source for the display panel, so that the display panel displays the image. Therefore, the above-mentioned display panel provided by the embodiments of the present disclosure can realize the transflective display panel.

During specific implementation, in the embodiments of the present disclosure, as shown in FIG. 1, the display panel may include a plurality of pixel units PX. Exemplarily, the pixel unit in the embodiments of the present disclosure may refer to a combination of sub-pixels that can independently display one pixel point.

Exemplarily, a pixel unit PX may include a plurality of sub-pixels, and the sub-pixels are arranged in an array. The plurality of sub-pixels in the pixel unit PX may include a first-color sub-pixel spx-1, a second-color sub-pixel spx-2, and a third-color sub-pixel spx-3 arranged in sequence in a first direction F1. Exemplarily, the first-color sub-pixel spx-1, the second-color sub-pixel spx-2, and the third-color sub-pixel spx-3 may be arbitrarily selected from a red sub-pixel, a green sub-pixel, and a blue sub-pixel. For example, the first-color sub-pixel spx-1 may be set as the red sub-pixel, the second-color sub-pixel spx-2 may be set as the green sub-pixel, and the third-color sub-pixel spx-3 may be set as the blue sub-pixel, so that red, green and blue can be adopted for color mixing to make the display panel realize the display effect.

Of course, in practical applications, the specific implementation of the sub-pixels in each pixel unit may be designed according to practical application environments, which is not limited herein. The following description will be given by taking as an example that a pixel unit includes a red sub-pixel, a green sub-pixel and a blue sub-pixel arranged in sequence in the first direction F1.

During specific implementation, K=2 or K=3 or K=4, etc. may be made. Of course, in practical applications, the specific implementation of K may be designed according to the practical application environments, which is not limited herein.

Exemplarily, during specific implementation, in the embodiments of the present disclosure, as shown in FIG. 1 to FIG. 2C, the base substrate may have first partitions Q-1 and second partitions Q-2. An orthographic projection of one first reflective electrode 110-1 on the base substrate 100 is located in one first partition Q-1, that is, a reflective electrode located in a first partition Q-1 may be used as a first reflective electrode 110-1. An orthographic projection of a second reflective electrode 110-2 on the base substrate 100 is located in one second partition Q-2, that is, a reflective electrode in a second partition Q-2 may be used as a second reflective electrode 110-2. A first reflective electrode 110-1 is provided with a first through hole 111, and a second reflective electrode 110-2 is provided with a second through hole 112. In addition, the display panel may further include: an opposite substrate 200 disposed opposite to the base substrate 100, and a color resist layer located between the base substrate 100 and the opposite substrate 200. The color resist layer may include: a sub-color resist layer located in respective sub-pixels. A sub-color resist layer may have a first sub-color resist region S-1 and a second sub-color resist region S-2. In a direction perpendicular to a plane where the base substrate 100 is located, a first partition Q-1 covers a corresponding first sub-color resist region S-1, and a second partition Q-2 covers a corresponding second sub-color resist region S-2. In this way, the same sub-pixel can realize multi-gray-scale display, so that the display effect can be improved.

During specific implementation, in the embodiments of the present disclosure, as shown in FIG. 1 to FIG. 2C, the display panel may further include a liquid crystal layer 300 encapsulated between the base substrate 100 and the opposite substrate 200. The opposite substrate 200 is provided with a common electrode, and the base substrate 100 is further provided with thin film transistors (TFTs) located in the respective partitions. In addition, the display panel may further include a plurality of gate lines and a plurality of data lines DA, gates of the TFTs in the same partitions of a row of sub-pixels may be electrically connected to one gate line, source electrodes of the TFTs of a column of sub-pixels may be electrically connected to one data line DA, and drain electrodes of the TFTs may be electrically connected to the reflective electrodes. Exemplarily, when signals transmitted on the gates control the TFTs to be turned on, data signals transmitted on the data lines DA may be input into the reflective electrodes, so that the reflective electrode inputs a voltage of the data signals for display. In addition, a corresponding voltage is also applied to the common electrode, so that there may be an electric field between the reflective electrodes and the common electrode to control the deflection of liquid crystal molecules, and combined with a light source, the display effect is achieved.

During specific implementation, in the embodiments of the present disclosure, as shown in FIG. 1 to FIG. 2C, the first reflective electrode 110-1 and the sub-color resist layer located in the first sub-color resist region S-1 may have a first facing area, and the second reflective electrode 110-2 and the sub-color resist layer located in the second sub-color resist region S-2 may have a second facing area. In the same sub-pixel, the first facing area is different from the second facing area. In this way, in the same sub-pixel, a luminous brightness of a region where the first facing area is located is different from a luminous brightness of a region where the second facing area is located, so that the same color sub-pixel can achieve brightness of different gray scales. It should be noted that an orthographic projection of the first reflective electrode 110-1 on the base substrate 100 and an orthographic projection of the sub-color resist layer located in the first sub-color resist region S-1 on the base substrate 100 may have a first overlapping region, and an area of the first overlapping region may be used as the first facing area. An orthographic projection of the second reflective electrode 110-2 on the base substrate 100 and an orthographic projection of the sub-color resist layer located in the second sub-color resist region S-2 on the base substrate 100 may have a second overlapping region. An area of the second overlapping region may be used as the second facing area.

Exemplarily, during specific implementation, in the embodiments of the present disclosure, as shown in FIG. 1 to FIG. 2C, in the same sub-pixel, an area of the first reflective electrode 110-1 and an area of the second reflective electrode 110-2 are approximately the same, and an area of the first sub-color resist region S-1 is smaller than an area of the second sub-color resist region S-2. In this way, when the display panel is in the reflective mode, since the area of the first sub-color resist region S-1 and the area of the second sub-color resist region S-2 are different, the brightness of the first partition Q-1 and the brightness of the second partition Q-2 are made different, and the same color sub-pixel can achieve the brightness of four gray scales. When the display panel is in the transmission mode, since the area of the first sub-color resist region S-1 and the area of the second sub-color resist region S-2 are different, the brightness of the first partition Q-1 and the brightness of the second partition Q-2 are made different, and the same color sub-pixel can achieve the brightness of four gray scales.

Exemplarily, a red sub-pixel is taken as an example for description. When the display panel is in the reflective mode, the backlight source is turned off, and the reflective electrodes reflect the external ambient light, so that the display panel displays. If neither the first partition Q-1 nor the second partition Q-2 emits light within one frame of display time, then red is used as a first gray scale H1. If only the first partition Q-1 emits light within one frame of display time, then red is used as a second gray scale H2. If only the second partition Q-2 emits light within one frame of display time, then red is used as a third gray scale H3. If both the first partition Q-1 and the second partition Q-2 emit light within one frame of display time, then red is used as a fourth gray scale H4. H1<H2<H3<H4. That is, H1 may be the lowest gray scale of red, and H4 may be the highest gray scale of red. Therefore, in one pixel unit, a red part may have four gray scales from a dark state to a bright state. Similarly, in one pixel unit, a green part may also have four gray scales from the dark state to the bright state, and a blue part may also have four gray scales from the dark state to the bright state. In this way, one pixel unit may display 64 gray scales of color.

During specific implementation, in the embodiments of the present disclosure, as shown in FIG. 1 to FIG. 2C and FIG. 6, the sub-color resist layer located in the first partition Q-1 may be provided with a first via hole, the first via hole penetrates through the sub-color resist layer, and the sub-color resist layer located in the second partition Q-2 is not provided with the first via hole. Moreover, an orthographic projection of the first via hole on the base substrate 100 does not overlap an orthographic projection of the first through hole 111 on the base substrate 100. Exemplarily, in the same sub-pixel, the sum of an area of the sub-color resist layer in the first partition Q-1 and an area of the first via hole may be the same as an area of the sub-color resist layer in the second partition Q-2. In this way, by arranging the first via hole, the area occupied by the sub-color resist layer in the first partition Q-1 is smaller than the area occupied by the sub-color resist layer in the second partition Q-2.

Figure 3:
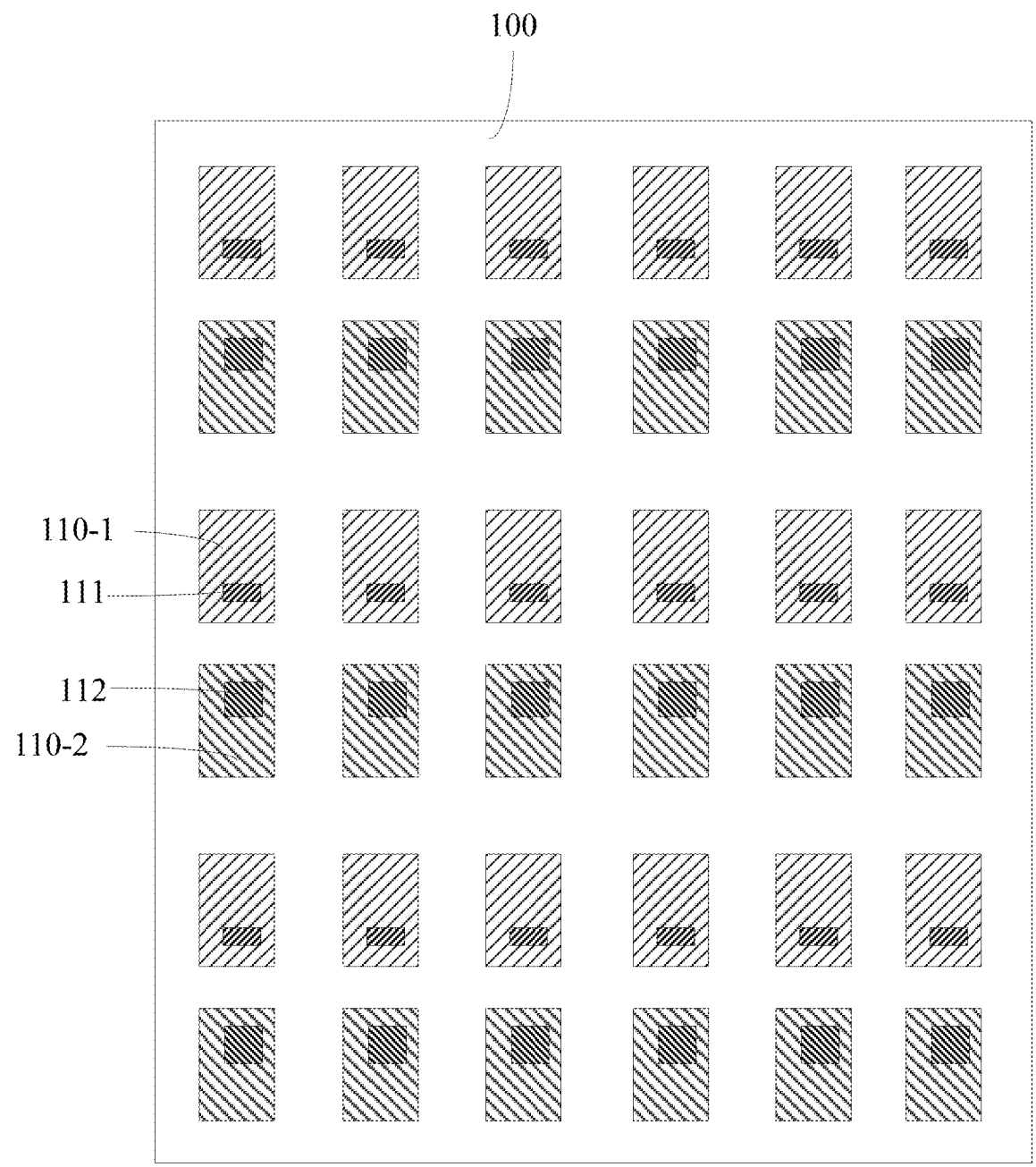
FIG. 3 is a schematic diagram of some top-view structures of a reflective electrode in a display panel provided by an embodiment of the present disclosure.

During specific implementation, in the embodiments of the present disclosure, an area of a first through hole and an area of a second through hole may be different in the same sub-pixel. Exemplarily, as shown in FIG. 1 and FIG. 3, in the same sub-pixel, the area of the second through hole 112 may be set to be Y times the area of the first through hole 111. 1<Y≤5 may be satisfied. Exemplarily, 2≤Y≤3 may be satisfied. For example, Y=2 may be set, and in the same sub-pixel, the area of the second through hole 112 may also be set to be twice the area of the first through hole 111, so that the light intensity of transmitted light of the second partition Q-2 may be twice the light intensity of transmitted light of the first partition Q-1. Y=3 may also be set, and in the same sub-pixel, the area of the second through hole 112 may also be set to be three times the area of the first through hole 111, so that the light intensity of the transmitted light in the second partition Q-2 may be three times the light intensity of the transmitted light of the first partition Q-1. Exemplarily, in each sub-pixel, the area of the first through hole 111 may be approximately the same. In each sub-pixel, the area of the second through hole 112 is approximately the same. It should be noted that, in practical applications, the area of the second through hole 112, the area of the first through hole 111 and a value of Y may be designed and determined according to the practical application environments, which is not limited herein.

Exemplarily, by taking Y=2 as an example, since in the same sub-pixel, the area of the second through hole 112 is set to be twice the area of the first through hole 111. In actual preparation, a region where the sub-pixel is located may be approximately mirror-symmetrical according to a central axis extending in the first direction F1, in order to make the area of the first reflective electrode 110-1 and the area of the second reflective electrode 110-2 the same in the same sub-pixel, a width of the first reflective electrode 110-1 in the first direction F1 and a width of the second reflective electrode 110-2 in the first direction F1 may be approximately the same, and a width of the second reflective electrode 110-2 in a second direction F2 may be greater than a width of the first reflective electrode 110-1 in the second direction F2. By taking a center of a region composed of the first reflective electrode 110-1 and the first through hole 111 as a first center, and a center of a region composed of the second reflective electrode 110-2 and the second through hole 112 as a second center, the first center is closer to the above-mentioned central axis than the second center, so that in the same sub-pixel, the area of the first reflective electrode 110-1 and the area of the second reflective electrode 110-2 may be the same.

Figure 4:
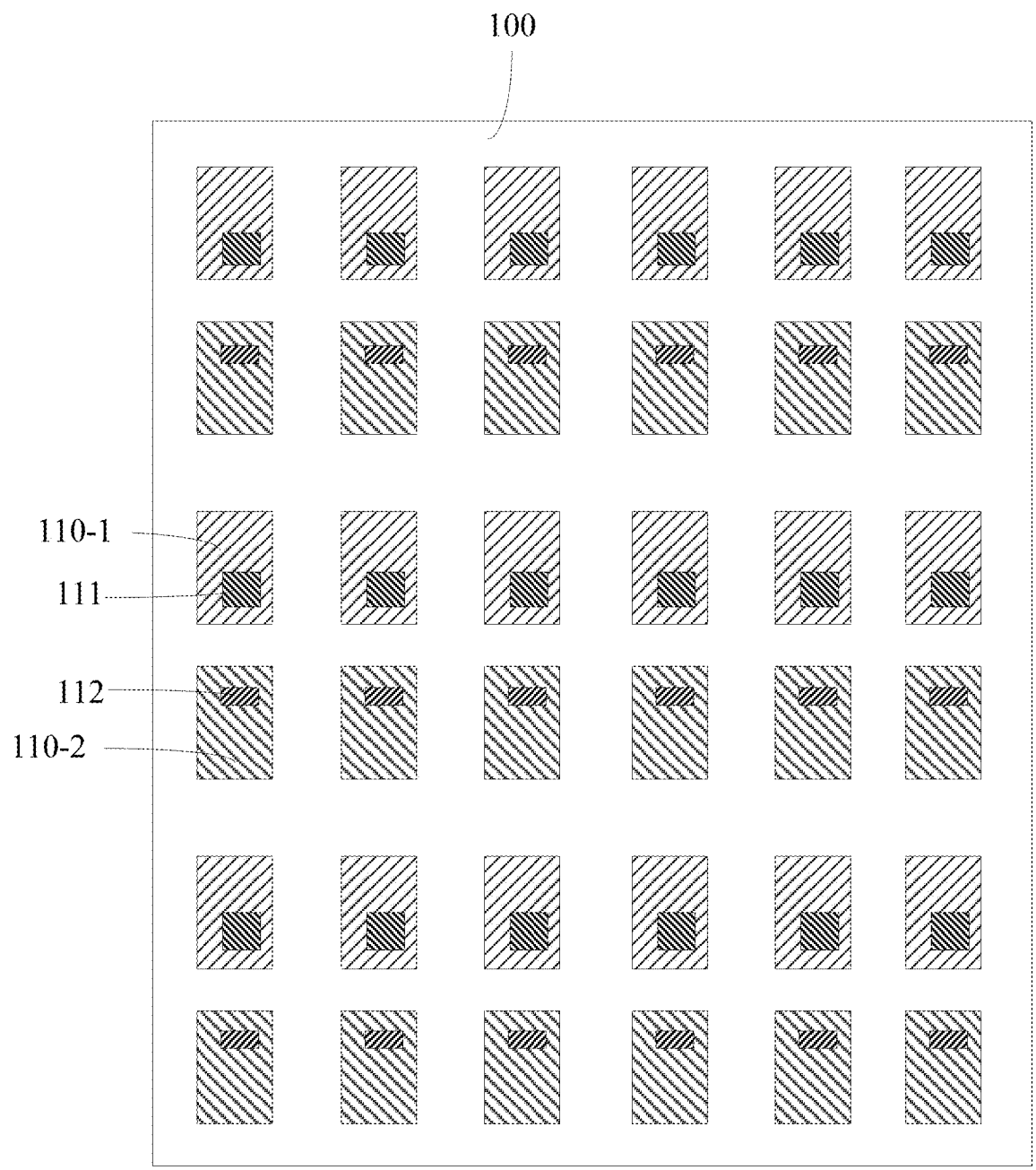
FIG. 4 is a schematic diagram of some other top-view structures of a reflective electrode in a display panel provided by an embodiment of the present disclosure.

During specific implementation, in the embodiments of the present disclosure, as shown in FIG. 4, in the same sub-pixel, the area of the first through hole 111 may also be set to be X times the area of the second through hole 112; and 1<X≤5 may be satisfied. Exemplarily, 2≤X≤3 may be satisfied. For example, X=2 may be set, and in the same sub-pixel, the area of the first through hole 111 may also be set to be twice the area of the second through hole 112, so that the light intensity of the transmitted light of the first partition Q-1 may be twice the light intensity of the transmitted light of the second partition Q-2. Alternatively, X=3 may be set, and in the same sub-pixel, the area of the first through hole 111 may also be set to be three times the area of the second through hole 112, so that the light intensity of the transmitted light of the first partition Q-1 may be three times the light intensity of the transmitted light of the second partition Q-2. Exemplarily, in each sub-pixel, the area of the first through hole 111 may be approximately the same. In each sub-pixel, the area of the second through hole 112 is approximately the same. It should be noted that, in practical applications, the area of the second through hole 112, the area of the first through hole 111 and a value of X may be designed and determined according to the practical application environments, which is not limited herein.

Exemplarily, by taking X=2 as an example, since in the same sub-pixel, the area of the first through hole 111 is set to be twice the area of the second through hole 112. In actual preparation, a region where the sub-pixel is located may be approximately mirror-symmetrical according to a central axis extending in the first direction F1, in order to make the area of the first reflective electrode 110-1 and the area of the second reflective electrode 110-2 the same in the same sub-pixel, a width of the first reflective electrode 110-1 in the first direction F1 and a width of the second reflective electrode 110-2 in the first direction F1 may be approximately the same, and a width of the first reflective electrode 110-1 in the second direction F2 may be greater than a width of the second reflective electrode 110-2 in the second direction F2. By taking the center of a region composed of the first reflective electrode 110-1 and the first through hole 111 as a first center, and a center of a region composed of the second reflective electrode 110-2 and the second through hole 112 as a second center, the first center is closer to the above-mentioned central axis than the second center, so that in the same sub-pixel, the area of the first reflective electrode 110-1 and the area of the second reflective electrode 110-2 may be the same.

Exemplarily, a red sub-pixel is taken as an example for description. When the display panel is in the transmission mode, a backlight source works, and through holes transmit the light emitted by the backlight source to enable the display panel to display. If neither the first partition Q-1 nor the second partition Q-2 emits light within one frame of display time, then red is used as a first gray scale H1. If only the first partition Q-1 emits light within one frame of display time, then red is used as a second gray scale H2. If only the second partition Q-2 emits light within one frame of display time, then red is used as a third gray scale H3. If both the first partition Q-1 and the second partition Q-2 emit light within one frame of display time, then red is used as a fourth gray scale H4. H1<H2<H3<H4. That is, H1 may be the lowest gray scale of red, and H4 may be the highest gray scale of red. Therefore, in one pixel unit, the red part may have four gray scales from the dark state to the bright state. Similarly, in one pixel unit, the green part may also have four gray scales from the dark state to the bright state, and the blue part may also have four gray scales from the dark state to the bright state. In this way, one pixel unit may display 64 gray scales of color.

Since the first reflective electrode is not disposed in a region of the first through hole, during specific implementation, as shown in FIG. 5B to FIG. 5E, a transparent conductive layer may be disposed on a side of the reflective electrode facing away from the base substrate. The transparent conductive layer may include a plurality of first sub-transparent conductive portions 310 disposed at intervals. An orthographic projection of one first sub-transparent conductive portion 310 on the base substrate 100 may be located in one first partition Q-1, that is, one first sub-transparent conductive portion 310 is disposed in one first partition Q-1. One first through hole 111 corresponds to one first sub-transparent conductive portion 310, and in the same first partition Q-1, an orthographic projection of the first sub-transparent conductive portion 310 on the base substrate 100 covers an orthographic projection of the first through hole 111 on the base substrate 100. Moreover, the orthographic projection of the first sub-transparent conductive portion 310 on the base substrate 100 is located within an orthographic projection of the first reflective electrode 110-1 on the base substrate 100. Further, the first sub-transparent conductive portion 310 is directly electrically connected to the first reflective electrode 110-1. For example, the transparent conductive layer is directly prepared on the reflective electrode. In this way, the first through hole may be shielded by the first sub-transparent conductive portion, and an electric field may also exist in the region of the first through hole, thereby improving the display effect.

Since the second reflective electrode is not disposed in a region of the second through hole, during specific implementation, as shown in FIG. 5B to FIG. 5E, a transparent conductive layer may be arranged on a side of the reflective electrode facing away from the base substrate. The transparent conductive layer may include a plurality of second sub-transparent conductive portions 320 disposed at intervals. An orthographic projection of one second sub-transparent conductive portion 320 on the base substrate 100 may be located in one second partition Q-2, that is, one second sub-transparent conductive portion 320 is disposed in one second partition Q-2. One second through hole 112 corresponds to one second sub-transparent conductive portion 320, and in the same second partition Q-2, the orthographic projection of the second sub-transparent conductive portion 320 on the base substrate 100 covers an orthographic projection of the second through hole 112 on the base substrate 100. Moreover, the orthographic projection of the second sub-transparent conductive portion 320 on the base substrate 100 is located within the orthographic projection of the second reflective electrode 110-2 on the base substrate 100. Further, the second sub-transparent conductive portion 320 is directly electrically connected to the second reflective electrode 110-2. For example, the transparent conductive layer is directly prepared on the reflective electrode. In this way, the second through hole 112 may be shielded by the second sub-transparent conductive portion 320, and an electric field may also exist in the region of the second through hole, thereby improving the display effect.

Figure 5A:
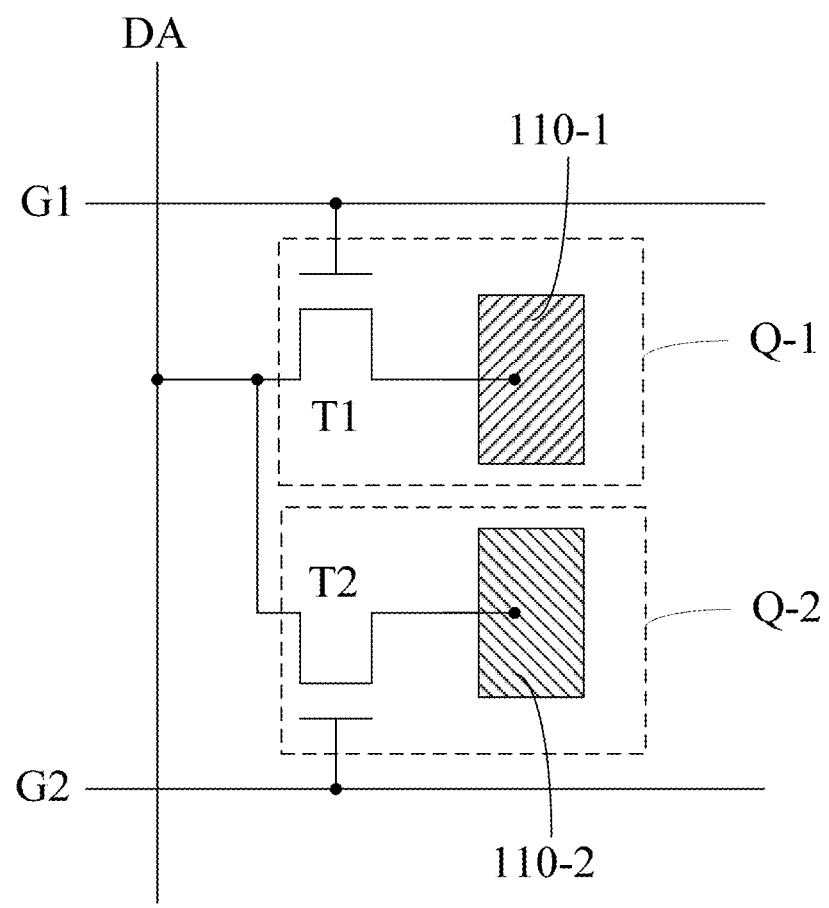
FIG. 5A is a diagram of an equivalent circuit in a sub-pixel of a display panel provided by an embodiment of the present disclosure.
Figure 5B:
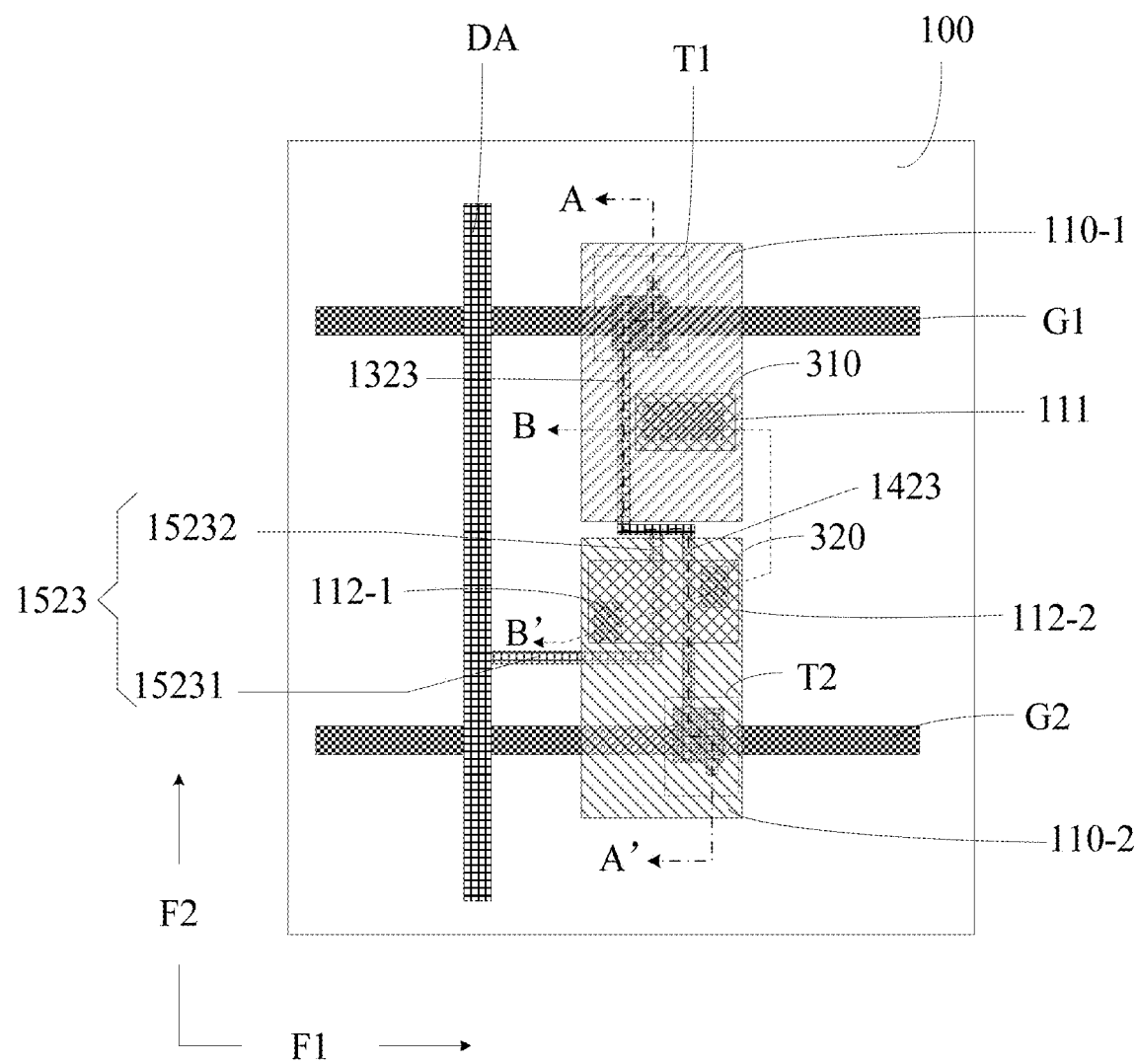
FIG. 5B is a schematic diagram of a layout structure in a sub-pixel of a display panel provided by an embodiment of the present disclosure.
Figure 5C:
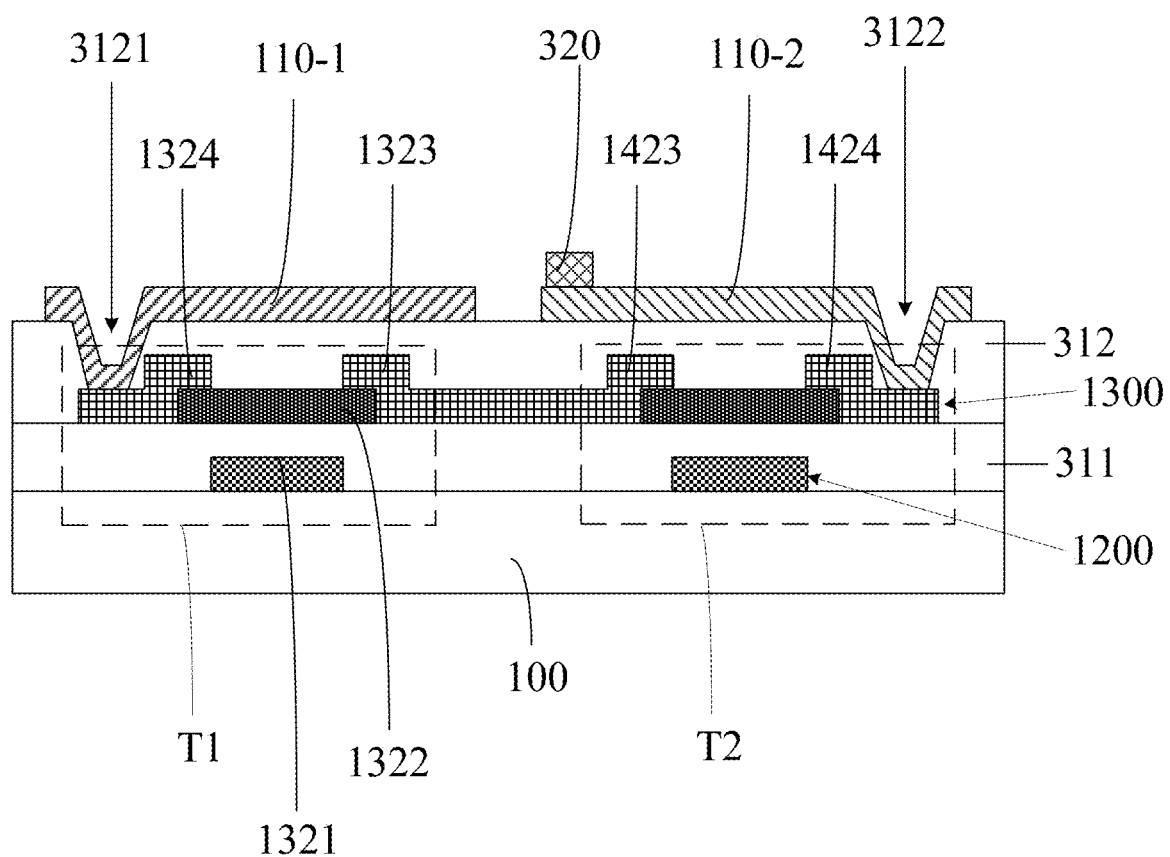
FIG. 5C is a schematic diagram of a cross-sectional structure of the display panel shown in FIG. 5B in an AA' direction.
Figure 5D:
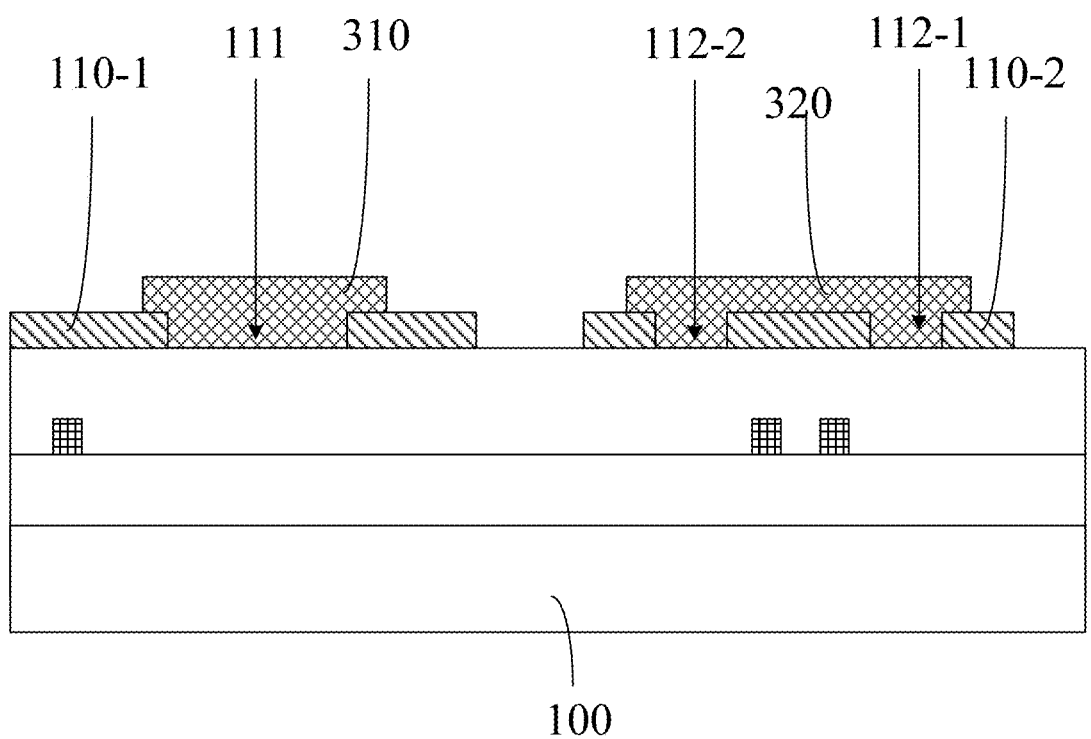
FIG. 5D is a schematic diagram of a cross-sectional structure of the display panel shown in FIG. 5B in a BB' direction.

During specific implementation, in the embodiments of the present disclosure, as shown in FIG. 5A to FIG. 5C, the display panel may further include: a first planarization layer 312, located between a layer where the reflective electrode is located and the base substrate 100; a source conductive layer 1300, located between the first planarization layer 312 and the base substrate 100, and including a plurality of data lines DA disposed at intervals; a gate insulating layer 311, located between the source conductive layer 1300 and the base substrate 100; and a gate conductive layer 1200, located between the gate insulating layer 311 and the base substrate 100, and including a plurality of first gate lines G1 and a plurality of second gate lines G2 disposed at intervals. One row of sub-pixels is electrically connected to one first gate line G1 and one second gate line G2, and one column of sub-pixels is electrically connected to one data line DA.

During specific implementation, in the embodiments of the present disclosure, as shown in FIG. 5A to FIG. 5C, the display panel may further include: a plurality of first transistors T1 and a plurality of second transistors T2 disposed at intervals. An orthographic projection of one first transistor T1 on the base substrate 100 is located in one first partition Q-1, and an orthographic projection of one second transistor T2 on the base substrate 100 is located in one second partition Q-2. Gates of the first transistors in one row of sub-pixels are electrically connected to the same first gate line, and gates of the second transistors in one row of sub-pixels are electrically connected to the same second gate line. First electrodes of the first transistors and first electrodes of the second transistors in one column of sub-pixels are electrically connected to the same data line. In the same first partition, a second electrode of the first transistor is electrically connected to the first reflective electrode. In addition, in the same second partition, a second electrode of the second transistor is electrically connected to the second reflective electrode. For example, the gate of the first transistor T1 is electrically connected to one first gate line G1, the first electrode of the first transistor T1 is electrically connected to one data line DA, and the second electrode of the first transistor T1 is electrically connected to the first reflective electrode 110-1. The gate of the second transistor T2 is electrically connected to one second gate line G2, the first electrode of the second transistor T2 is electrically connected to one data line DA, and the second electrode of the second transistor T2 is electrically connected to the second reflective electrode 110-2.

Exemplarily, as shown in FIG. 5B and FIG. 5C, a semiconductor layer is further disposed between the gate insulating layer 311 and the source conductive layer 1300. The semiconductor layer may include an active layer forming each transistor. The active layer has a channel region. The gate conductive layer 1200 may further include the gate that forms each transistor. The source conductive layer 1300 may further include: a plurality of source connection portions 1523, a plurality of first source portions 1323, a plurality of second source portions 1423, a plurality of first drain portions 1324, and a plurality of second drain portions 1424. One source connection portion 1523, one first source portion 1323, one first drain portion 1324, one second source portion and one second drain portion 1424 are located in one sub-pixel. One first source portion 1323 serves as a first electrode of one first transistor T1, and one first drain portion 1324 serves as a second electrode of one first transistor T1. One second source portion 1423 serves as a first electrode of one second transistor T2, and one second drain portion 1424 serves as a second electrode of one second transistor T2. In addition, in the same sub-pixel, the first source portion 1323 and the second source portion 1423 are electrically connected to the same data line DA through the source connection portion 1523. Of course, the present disclosure includes, but is not limited to, this.

Exemplarily, as shown in FIG. 5C, by taking the first transistor T1, a first electrode being a source electrode and a second electrode being a drain electrode as an example. The first transistor T1 may include: a gate 1321, an active layer 1322 insulated from the gate 1321, a first source portion 1323 and a first drain portion 1324 which are insulated from the gate 1321 and electrically connected to the active layer 1322, a first reflective electrode 110-1 and a second reflective electrode 110-2. The gate 1321 is located between the active layer 1322 and the base substrate 100. A layer where the first source portion 1323 and the first drain portion 1324 are located is located on a side of the active layer 1322 facing away from the base substrate 100. A gate insulating layer 311 is disposed between the gate 1321 and the active layer 1322. The first source portion 1323 and the first drain portion 1324 are respectively directly overlapped with the active layer 1322. A first planarization layer 312 is disposed between a layer where the first source portion 1323 and the first drain portion 1324 are located and a layer where the first reflective electrode 110-1 and the second reflective electrode 110-2 are located. The first reflective electrode 110-1 is electrically connected to the first drain portion 1324 through a via hole 3121 penetrating through the first planarization layer 312. A structure of the second transistor T2 is substantially the same as a structure of the first transistor T1, the second reflective electrode 110-2 is electrically connected to the second electrode of the second transistor T2 through a via hole 3122 penetrating through the first planarization layer 312, and other structures are not repeated herein.

Figure 5E:
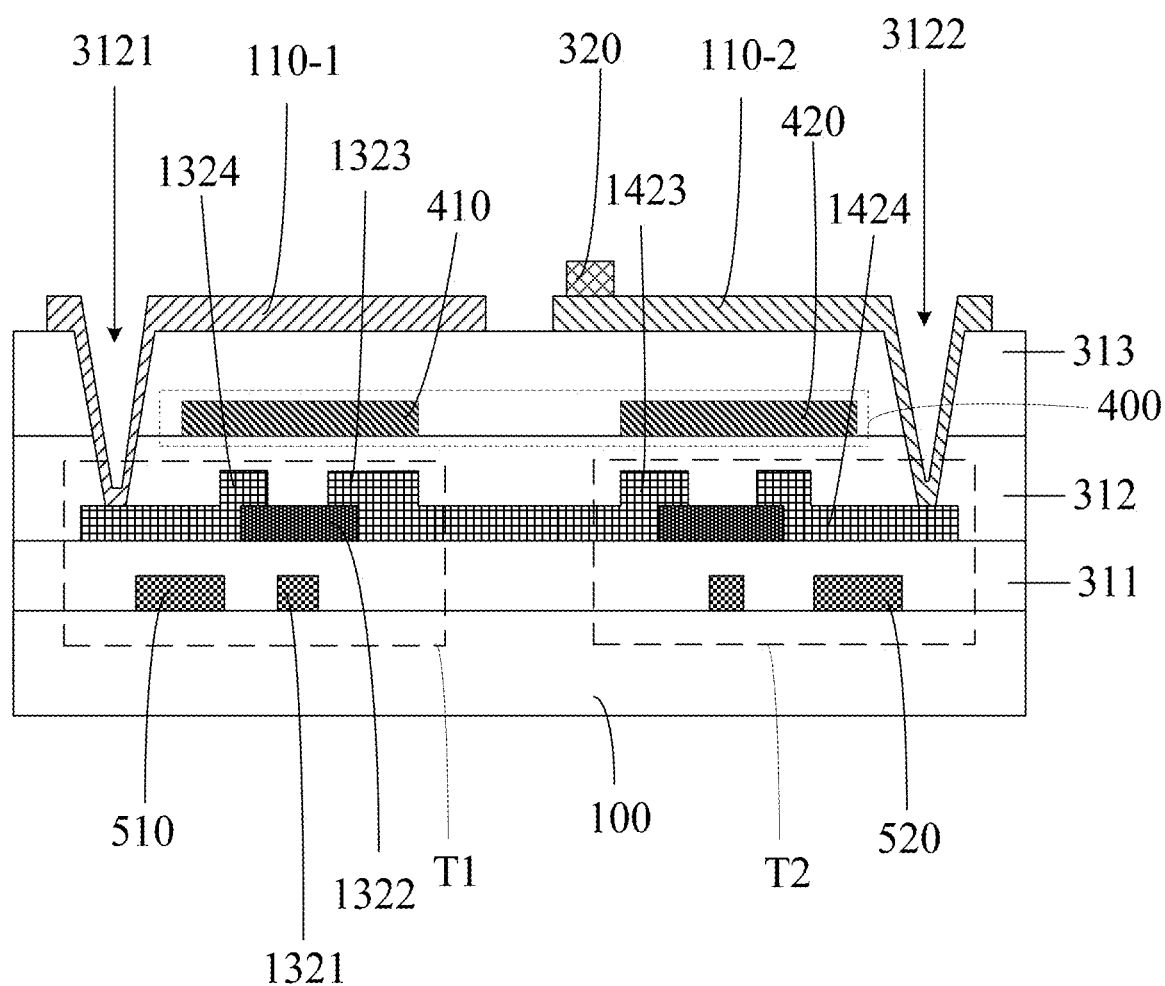
FIG. 5E is a schematic diagram of some other cross-sectional structures of the display panel shown in FIG. 5B in an AA' direction.

During specific implementation, in order to increase a capacitance value of the first reflective electrode and the second reflective electrode, as shown in FIG. 5E, an auxiliary electrode layer 400 may be disposed between a layer where the reflective electrodes are located and the first planarization layer 312, and a second planarization layer 313 may be disposed between the auxiliary electrode layer 400 and the layer where the reflective electrodes are located. In addition, the first reflective electrode 110-1 is electrically connected to the first drain portion 1324 through a via hole 3121 penetrating through the first planarization layer 312 and the second planarization layer 313. The second reflective electrode 110-2 is electrically connected with the second electrode of the second transistor T2 through a via hole 3122 penetrating through the first planarization layer 312 and the second planarization layer 313, and other structures are not repeated herein.

Exemplarily, as shown in FIG. 5E, the auxiliary electrode layer 400 may include a plurality of first auxiliary electrodes 410 disposed at intervals. An orthographic projection of one first auxiliary electrode 410 on the base substrate 100 is located in one first partition Q-1, that is, the first partition Q-1 is provided with one first auxiliary electrode 410, one first reflective electrode 110-1 corresponds to one first auxiliary electrode 410, and in the same first partition Q-1, the orthographic projection of the first reflective electrode 110-1 on the base substrate 100 covers the orthographic projection of the first auxiliary electrode 410 on the base substrate 100. In this way, a facing area exists between the first reflective electrode 110-1 and the first auxiliary electrode 410 so as to form a capacitor structure C11.

Exemplarily, as shown in FIG. 5E, the auxiliary electrode layer 400 may include a plurality of second auxiliary electrodes 420 disposed at intervals. An orthographic projection of one second auxiliary electrode 420 on the base substrate 100 is located in one second partition Q-2, that is, the second partition Q-2 is provided with one second auxiliary electrode 420, one second reflective electrode 110-2 corresponds to one second auxiliary electrode 420. In the same second partition Q-2, the orthographic projection of the second reflective electrode 110-2 on the base substrate 100 covers the orthographic projection of the second auxiliary electrode 420 on the base substrate 100. In this way, a facing area exists between the second reflective electrode 110-2 and the second auxiliary electrode 420 so as to form a capacitor structure C12.

Further, in order to increase a capacitance value of the first reflective electrode and the second reflective electrode, as shown in FIG. 5B and FIG. 5E, the gate conductive layer may further include: a plurality of first compensation electrodes 510 disposed at intervals, that is, the plurality of first compensation electrodes 510 spaced from each other may be disposed in a layer where the gate 1321 is located. An orthographic projection of one first compensation electrode 510 on the base substrate 100 is located in one first partition Q-1, that is, one first reflective electrode 110-1 corresponds to one first compensation electrode 510. In addition, in the same first partition Q-1, the orthographic projection of the first reflective electrode 110-1 on the base substrate 100 covers the orthographic projection of the first compensation electrode 510 on the base substrate 100, and the orthographic projection of the first compensation electrode 510 on the base substrate 100 and an orthographic projection of the first drain portion 1324 of the first transistor T1 on the base substrate 100 have an overlapping region. In this way, a facing area exists between the first compensation electrode 510 and the first drain portion 1324 of the first transistor T1 so as to form a capacitor structure C21.

Exemplarily, as shown in FIG. 5B and FIG. 5E, the gate conductive layer 1200 may further include: a plurality of second compensation electrodes 520 disposed at intervals. An orthographic projection of one second compensation electrode 520 on the base substrate 100 is located in one second partition Q-2, that is, one second reflective electrode 110-2 corresponds to one second auxiliary electrode 420. In addition, in the same second partition Q-2, the orthographic projection of the second reflective electrode 110-2 on the base substrate 100 covers the orthographic projection of the second compensation electrode 520 on the base substrate 100, and the orthographic projection of the second compensation electrode 520 on the base substrate 100 and an orthographic projection of the second drain portion 1424 of the second transistor T2 on the base substrate 100 have an overlapping region. In this way, a facing area exists between the second compensation electrode 520 and the second drain portion 1424 of the second transistor T2 so as to form a capacitor structure C22.

In summary, the capacitor structures C11 and C21 are formed in a parallel relationship so as to increase the capacitance value of the first reflective electrode, and the capacitor structures C12 and C22 are formed in a parallel relationship so as to increase the capacitance value of the second reflective electrode. In addition, it should be noted that the sum of capacitance values of the first reflective electrode may be substantially the same as the sum of capacitance values of the second reflective electrode. For example, the capacitance value of the capacitor structure C11 and the capacitance value of the capacitor structure C21 may be approximately the same, and the capacitance value of the capacitor structure C12 and the capacitance value of the capacitor structure C22 may be approximately the same. Of course, in practical applications, the specific structural forms of the capacitor structures C11, C12, C21 and C22 may be designed and determined according to practical application environments, which is not limited herein.

Generally, the source conductive layer and the gate conductive layer are prepared and formed by using metal materials. The metal materials are generally opaque to light. Therefore, in order to prevent the source conductive layer and the gate conductive layer from shielding the first through hole, during specific implementation, in the embodiments of the present disclosure, as shown in FIG. 5B, the orthographic projection of the first through hole on the base substrate does not overlap with orthographic projections of the source conductive layer and the gate conductive layer on the base substrate. In this way, the source conductive layer and the gate conductive layer are prevented from shielding the light of the first through hole.

During specific implementation, in the embodiments of the present disclosure, as shown in FIG. 5B, the orthographic projection of the second through hole on the base substrate does not overlap the orthographic projections of the source conductive layer and the gate conductive layer on the base substrate. In this way, the source conductive layer and the gate conductive layer are prevented from shielding the light of the second through hole.

During specific implementation, in the embodiments of the present disclosure, as shown in FIG. 5B, for the first gate line G1 and the first reflective electrode 110-1 electrically connected with the first transistor T1, orthographic projections of the first gate line G1 and the first transistor T1 on the base substrate 100 and the orthographic projection of the first reflective electrode 110-1 on the base substrate 100 respectively have overlapping regions. For example, the orthographic projection of the first reflective electrode 110-1 on the base substrate 100 covers the orthographic projection of the first transistor T1 on the base substrate 100, and the orthographic projection of the first reflective electrode 110-1 on the base substrate 100 and an orthographic projection of the first gate line G1 on the base substrate 100 have an overlapping region. Since a film layer where the first gate line G1 and the first transistor T1 are located is located between the first reflective electrode 110-1 and the base substrate 100, and the orthographic projection of the first gate line G1 on the base substrate 100 and the orthographic projections of the first reflective electrode 110-1 and the first transistor T1 on the base substrate 100 have an overlapping region, the first reflective electrode 110-1 may be configured to shield the first gate line G1 and the first transistor T1 to improve an occupied area of the first reflective electrode 110-1 on the sub-pixel, thereby improving the pixel aperture ratio.

During specific implementation, in the embodiments of the present disclosure, as shown in FIG. 5B, for the second gate line G2 and the second reflective electrode 110-2 electrically connected with the second transistor T2, orthographic projections of the second gate line G2 and the second transistor T2 on the base substrate 100 and the orthographic projection of the second reflective electrode 110-2 on the base substrate 100 respectively have overlapping regions. For example, the orthographic projection of the second reflective electrode 110-2 on the base substrate 100 covers the orthographic projection of the second transistor T2 on the base substrate 100, and the orthographic projection of the second reflective electrode 110-2 on the base substrate 100 and the orthographic projection of the second gate line G2 on the base substrate 100 have an overlapping region. Since a film layer where the second gate line G2 and the second transistor T2 are located is located between the second reflective electrode 110-2 and the base substrate 100, and the orthographic projection of the second gate line G2 on the base substrate 100 and the orthographic projections of the second reflective electrode 110-2 and the second transistor T2 on the base substrate 100 have an overlapping region, the second reflective electrode 110-2 may be configured to shield the second gate line G2 and the second transistor T2 to improve an occupied area of the second reflective electrode 110-2 on the sub-pixel, thereby improving the pixel aperture ratio.

Figure 5F:
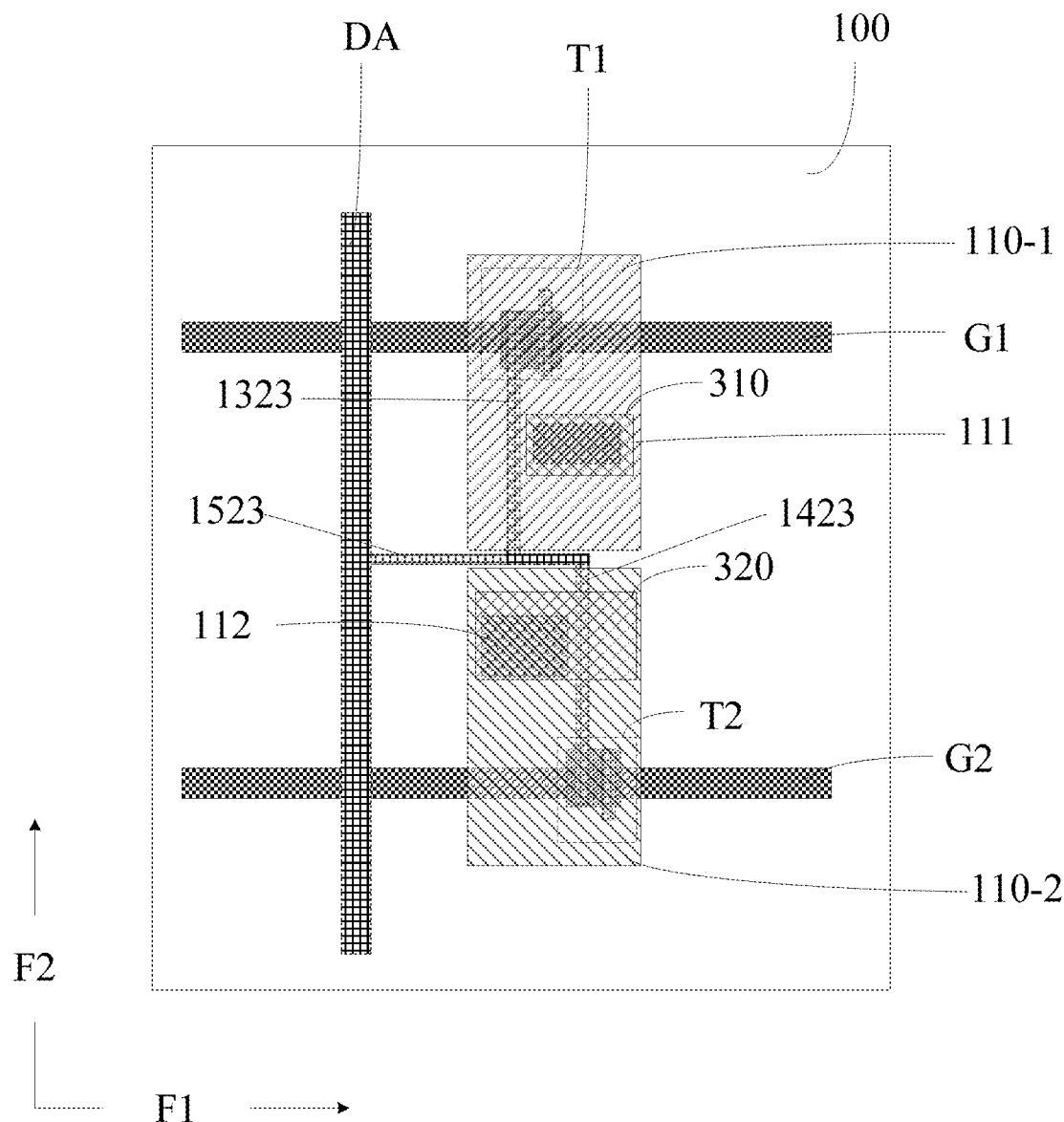
FIG. 5F is a schematic diagram of some other layout structures in a sub-pixel of a display panel provided by an embodiment of the present disclosure.

During specific implementation, in the embodiments of the present disclosure, as shown in FIG. 5F, the source connection portion 1523 may extend in the first direction F1. In addition, the first reflective electrode 110-1 may be provided with one first through hole 111. The second reflective electrode 110-2 may also be provided with one second through hole 112. For example, an orthographic projection of the source connection portion 1523 on the base substrate may not overlap with the orthographic projections of the first reflective electrode 110-1 and the second reflective electrode 110-2 on the base substrate 100. This can reduce the length of the source connection portion 1523, thereby reducing signal delay.

During specific implementation, in the embodiments of the present disclosure, as shown in FIG. 5B, the first reflective electrode 110-1 may be provided with one first through hole 111. For example, an area of the first through hole 111 may be set to be 208.377 $\mu m^2$. Exemplarily, a shape of the first through hole 111 may be set as a rectangle, long sides of the rectangle may extend in the first direction F1, short sides of the rectangle may extend in the second direction F2, and a width of the long sides may be 2 to 3 times a width of the short sides. In practical applications, lengths of the long sides and the short sides of the first through hole 111 may be set according to the requirements of the practical applications, which are not limited herein.

During specific implementation, in the embodiments of the present disclosure, as shown in FIG. 5B, the source connection portion 1523 may be set in a form of a curve or a broken line. The second through hole 112 may include a first sub-through hole 112-1 and a second sub-through hole 112-2 disposed at an interval, that is, the second reflective electrode 110-2 may be provided with one first sub-through hole 112-1 and one second sub-through hole 112-2, so that the second through hole is divided into two, and the two may be disposed in the second reflective electrode 110-2 in a dispersed mode. Exemplarily, areas of the first sub-through hole 112-1 and the second sub-through hole 112-2 may be approximately the same. For example, an area of the first sub-through hole 112-1 may be set to be 4.008 $\mu m^2$. Exemplarily, a shape of the first sub-through hole 112-1 may be a rectangle, long sides of the rectangle may extend in the second direction F2, short sides of the rectangle may extend in the first direction F1, and a width of the long sides may be 1.5 to 2 times a width of the short sides. A shape of the second sub-through hole 112-2 may be a rectangle, long sides of the rectangle may extend in the second direction F2, and short sides of the rectangle may extend in the first direction F1. Of course, in practical applications, the long sides and the short sides of the first sub-through hole 112-1 and the second sub-through hole 112-2 may be designed according to the requirements of the practical application environments, which are not limited herein.

Exemplarily, as shown in FIG. 5B, for one sub-pixel, an orthographic projection of a first sub-through hole 112-1 on the base substrate 100 is closer to an orthographic projection of a data line DA electrically connected to a sub-pixel on the base substrate 100 than an orthographic projection of a second sub-through hole 112-2 on the base substrate 100.

Exemplarily, as shown in FIG. 5B, for one sub-pixel, the orthographic projection of the second sub-through hole 112-2 on the base substrate 100 is closer to the orthographic projection of the data line DA electrically connected to the sub-pixel on the base substrate 100 than the orthographic projection of the first sub-through hole 112-1 on the base substrate 100.

Further, as shown in FIG. 5B, in the same sub-pixel, the orthographic projection of the first sub-through hole 112-1 on the base substrate 100 is located on a side of the orthographic projection of the source connection portion 1523 on the base substrate 100 close to the orthographic projection of the data line DA on the base substrate 100; an orthographic projection of the second source portion 1423 on the base substrate 100 is located on a side of the orthographic projection of the source connection portion 1523 on the base substrate 100 away from the orthographic projection of the data line DA on the base substrate 100; and the orthographic projection of the second sub through hole 112-2 on the base substrate 100 is located on a side of the orthographic projection of the second source portion 1423 on the base substrate 100 away from the orthographic projection of the source connection portion 1523 on the base substrate 100.

Exemplarily, as shown in FIG. 5B, the source connection portion 1523 may include: a first sub-source connection portion 15231 and a second sub-source connection portion 15232 electrically connected to each other; the first sub-source connection portion 15231 extends in the first direction F1, and the second sub-source connection portion 15232 extends in the second direction F2; and the first sub-source connection portion 15231 is electrically connected to the data line DA, and the second sub-source connection portion 15232 is electrically connected to the first source portion 1323 and the second source portion 1423 respectively. In this way, the source connection portion 1523 may be disposed in a zigzag shape. Of course, the present disclosure includes, but is not limited to, this.

Exemplarily, as shown in FIG. 5B, the orthographic projection of the first sub-through hole 112-1 on the base substrate 100 may be located between an orthographic projection of the first sub-source connection portion 15231 on the base substrate 100 and the orthographic projection of the data line DA on the base substrate 100, and the orthographic projection of the first sub-through hole 112-1 on the base substrate 100 is located between an orthographic projection of the second sub-source connection portion 15232 on the base substrate 100 and the orthographic projection of the first gate line G1 on the base substrate 100.

Figure 6:
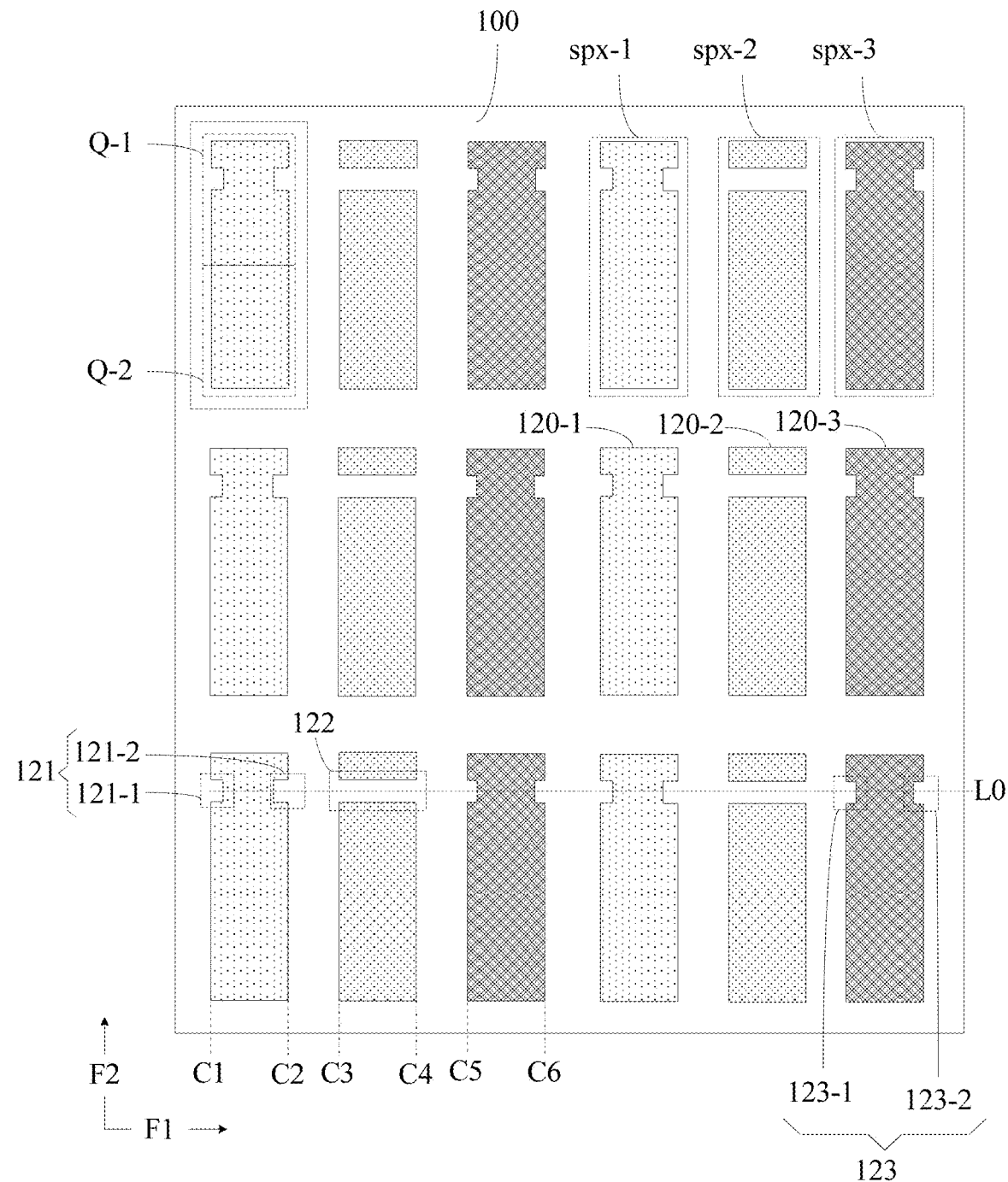
FIG. 6 is a schematic diagram of some top-view structures of a sub-color resist layer in a display panel provided by an embodiment of the present disclosure.

Exemplarily, as shown in FIG. 1, FIG. 2A and FIG. 6, in the first-color sub-pixel spx-1 (for example, the red sub-pixel), the sub-color resist layer located in the first partition Q-1 is provided with the first via hole 121, and the first via hole 121 penetrates through the sub-color resist layer 120-1. As shown in FIG. 1, FIG. 2B and FIG. 6, in the second-color sub-pixel spx-2 (for example, the green sub-pixel), the sub-color resist layer located in the first partition Q-1 is provided with the first via hole 122, and the first via hole 122 penetrates through the sub-color resist layer 120-2. As shown in FIG. 1, FIG. 2C and FIG. 6, in the third-color sub-pixel spx-3 (for example, the blue sub-pixel), the sub-color resist layer located in the first partition Q-1 is provided with the first via hole 123, and the first via hole 123 penetrates through the sub-color resist layer 120-3.

Generally, human eyes have different sensitivities to light of different colors. For example, the human eyes have the highest sensitivity to green, the second highest sensitivity to red, and the lowest sensitivity to blue. If the areas of the first via holes in the sub-pixels of different colors are set to be the same, when viewing a picture displayed by the display panel, the human eyes will feel that the picture is greenish. In order to improve the display effect, sizes of the first via holes in the sub-pixels of different colors may be designed according to the sensitivities of the human eyes to red, green and blue. During specific implementation, as shown in FIG. 1, the area of the first via hole 122 in the second-color sub-pixel spx-2 may be made greater than the area of the first via hole 121 in the first-color sub-pixel spx-1, and the area of the first via hole 121 in the first-color sub-pixel spx-1 may be made greater than the area of the first via hole 123 in the third-color sub-pixel spx-3. Exemplarily, the area of the first via hole in the green sub-pixel may be made greater than the area of the first via hole in the red sub-pixel, and the area of the first via hole in the red sub-pixel may be made greater than the area of the first via hole in the blue sub-pixel. In this way, the emission of green light from the green sub-pixel can be reduced, so that the problem that the picture is greenish is solved.

During specific implementation, in the embodiments of the present disclosure, as shown in FIG. 1 and FIG. 6, a first-color sub-pixel spx-1 may have a first side C1 and a second side C2 opposite to each other. The first side C1 and the second side C2 are arranged in the first direction F1. The first via hole 121 in the first-color sub-pixel spx-1 may include a first sub-via hole 121-1 and a second sub-via hole 121-2; and the first sub-via hole 121-1 is located on the first side C1, and the second sub-via hole 121-2 is located on the second side C2. In this way, the first sub-via hole 121-1 and the second sub-via hole 121-2 may be respectively disposed on edges of the sub-color resist layer.

During specific implementation, in the embodiments of the present disclosure, as shown in FIG. 1 and FIG. 6, an area of the first sub-via hole 121-1 and an area of the second sub-via hole 121-2 may be approximately the same. In this way, the first sub-via hole 121-1 and the second sub-via hole 121-2 may be uniformly prepared, thereby reducing the difficulty of process preparation. Exemplarily, a shape of an orthographic projection of the first sub-via hole 121-1 on the base substrate 100 may be approximately the same as a shape of an orthographic projection of the second sub-via hole 121-2 on the base substrate 100, and an area of the orthographic projection of the first sub-via hole 121-1 on the base substrate 100 may be approximately the same as an area of the orthographic projection of the second sub-via hole 121-2 on the base substrate 100. For example, shapes of the first sub-via hole 121-1 and the second sub-via hole 121-2 may be set as rectangles, long sides of the rectangles extend in the second direction F2, and short sides of the rectangles extend in the first direction F1. In addition, an area of a rectangle may be set to be 200 $\mu m^2$. Exemplarily, the long sides of the rectangles may be 2-3 times the short sides. Of course, in practical applications, the requirements of display panels in different application environments are different, so the areas of the first sub-via hole 121-1 and the second sub-via hole 121-2 can be designed according to the practical application environments, which is not limited herein.

During specific implementation, in the embodiments of the present disclosure, as shown in FIG. 1 and FIG. 6, a second-color sub-pixel spx-2 has a third side C3 and a fourth side C4 opposite to each other. The third side C3 and the fourth side C4 are arranged in the first direction F1. In addition, the orthographic projection of the first via hole in the second-color sub-pixel spx-2 on the base substrate 100 extends from the third side C3 to the fourth side C4. Exemplarily, the first via hole in the second-color sub-pixel spx-2 may be set as a rectangle, long sides of the rectangle extend in the first direction F1, and short sides of the rectangle extend in the second direction F2. An area of the rectangle may be set to be 812 $\mu m^2$. Exemplarily, a width of the long sides of the rectangle may be 2-3 times a width of the short sides. Of course, in practical applications, the requirements of display panels in different application environments are different, so the first via hole in the second-color sub-pixel spx-2 can be designed according to the practical application environments, which is not limited herein.

During specific implementation, in the embodiments of the present disclosure, as shown in FIG. 1 and FIG. 6, a third-color sub-pixel spx-3 has a fifth side C5 and a sixth side C6 opposite to each other. The fifth side C5 and the sixth side C6 are arranged in the first direction F1. In addition, the first via hole in the third-color sub-pixel spx-3 may include a third sub-via hole 123-1 and a fourth sub-via hole 123-2; and the third sub-via hole 123-1 is located on the fifth side C5, and the fourth sub-via 123-2 is located on the sixth side C6. In this way, the third sub-via hole 123-1 and the fourth sub-via hole 123-2 may be respectively disposed on the edges of the sub-color resist layer.

During specific implementation, in the embodiments of the present disclosure, as shown in FIG. 1 and FIG. 6, an area of the third sub-via hole 123-1 and an area of the fourth sub-via hole 123-2 may be approximately the same. In this way, the third sub-via hole 123-1 and the fourth sub-via hole 123-2 may be uniformly prepared, thereby reducing the difficulty of process preparation. Exemplarily, a shape of an orthographic projection of the third sub-via hole 123-1 on the base substrate 100 may be approximately the same as a shape of an orthographic projection of the fourth sub-via hole 123-2 on the base substrate 100, and an area of the orthographic projection of the third sub-via hole 123-1 on the base substrate 100 may be approximately the same as an area of the orthographic projection of the fourth sub-via hole 123-2 on the base substrate 100. For example, shapes of the third sub-via hole 123-1 and the fourth sub-via hole 123-2 may be set as rectangles, the long sides of the rectangles extend in the second direction F2, and the short sides of the rectangles extend in the first direction F1. In addition, an area of a rectangle may be set to be 157 $\mu m^2$. Exemplarily, the long sides of the rectangles may be 2-3 times the short sides. Of course, in practical applications, the requirements of display panels in different application environments are different, so the areas of the third sub-via hole 123-1 and the fourth sub-via hole 123-2 can be designed according to the practical application environments, which is not limited herein.

Figure 7:
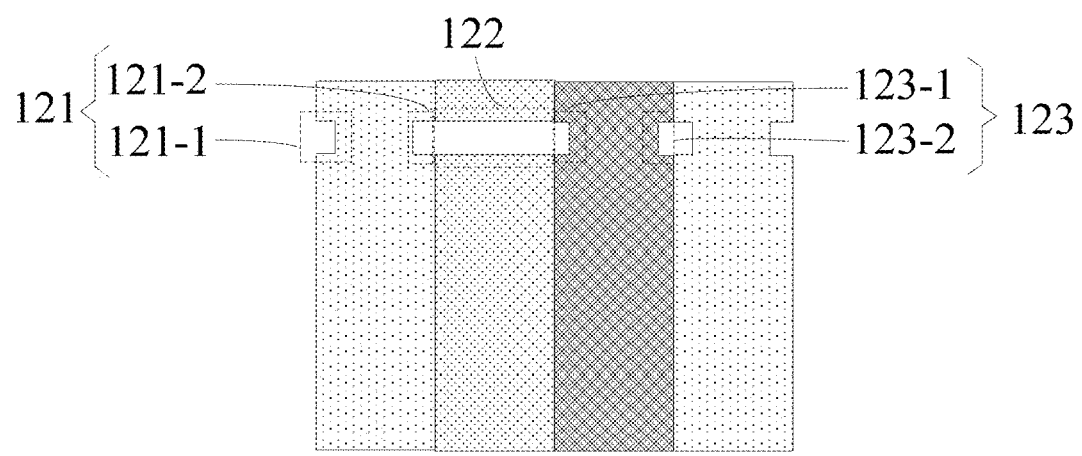
FIG. 7 is a schematic diagram of some other top-view structures of a sub-color resist layer in a display panel provided by an embodiment of the present disclosure.

During specific implementation, in the embodiments of the present disclosure, as shown in FIG. 6, a center of a first via hole in the first-color sub-pixel spx-1, a center of a first via hole in the second-color sub-pixel spx-2, and a center of a first via hole in the third-color sub-pixel spx-3 are arranged on the same straight line L0 in the first direction F1. In this way, the design difficulty of these first via holes can be reduced. In practical applications, the sub-color resist layers in every two adjacent sub-pixels may have an overlapping region or be adjacent. As shown in FIG. 7, when the sub-color resist layers in every two adjacent sub-pixels are adjacent to each other, when the first via holes are rectangles, the long side of the first sub-via hole 121-1 in the first-color sub-pixel spx-1 may coincide with the long side of the fourth sub-via hole 123-2 in the third-color sub-pixel spx-3. The long side of the second sub-via hole 121-2 in the first-color sub-pixel spx-1 may coincide with the short side of the first via hole located on the third side C3 in the second-color sub-pixel spx-2. The short side of the second sub-via hole 121-2 located on the fourth side C4 in the first-color sub-pixel spx-1 may coincide with the long side of the third sub-via hole 123-1 in the third-color sub-pixel spx-3.

It should be noted that the first direction F1 may be a row direction of the sub-pixels, and the second direction F2 may be a column direction of the sub-pixels. Alternatively, the first direction F1 may also be a column direction of the sub-pixels, and the second direction F2 may be a row direction of the sub-pixels. In practical applications, this may be designed and determined according to the practical application environments, which is not limited herein.

It should be noted that, in an actual technology, due to the restriction of process conditions or other factors, the same in each of the above-mentioned features cannot be completely identical, and there may be some deviations, so the same relationship between the above-mentioned features only approximately satisfies the above-mentioned conditions, and all belong to the protection scope of the present disclosure. For example, the above-mentioned same may be the same as allowed within an error tolerance.

Figure 8:
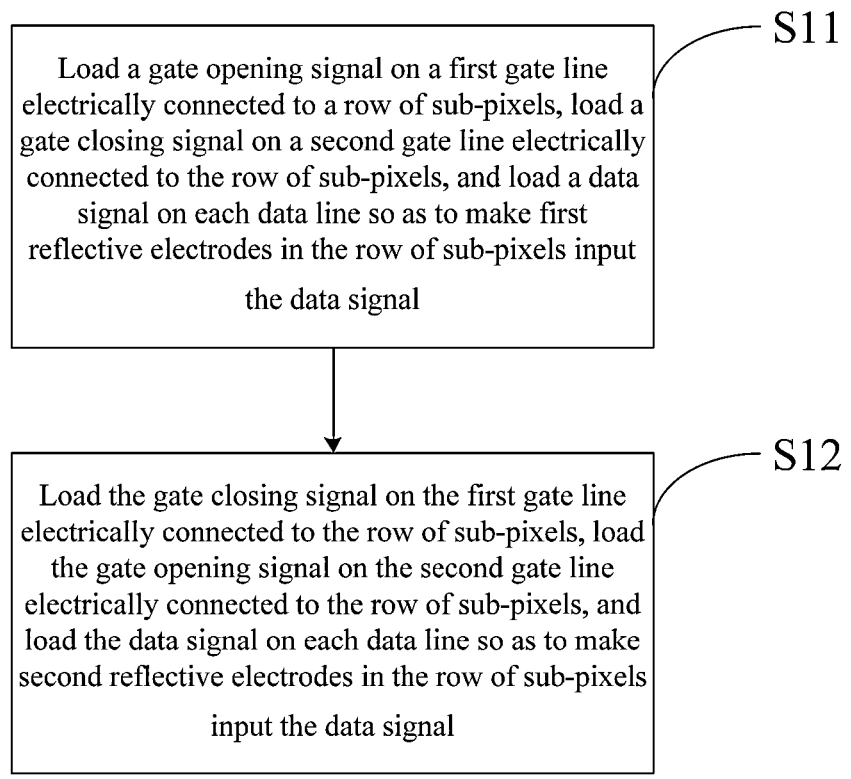
FIG. 8 is a flow diagram of a driving method provided by an embodiment of the present disclosure.

An embodiment of the present disclosure further provides a driving method of the above-mentioned display panel. The driving method may include: driving a row of sub-pixels in respective data input stages of a frame of time. Driving the row of sub-pixels in a data writing stage, as shown in FIG. 8, may include the following operations.

S11, a gate opening signal is loaded on a first gate line G1 electrically connected to the row of sub-pixels, a gate closing signal is loaded on a second gate line G2 electrically connected to the row of sub-pixels, and a data signal is loaded on each data line DA so as to make first reflective electrodes 110-1 in the row of sub-pixels input the data signal.

S12, the gate closing signal is loaded on the first gate line G1 electrically connected to the row of sub-pixels, the gate opening signal is loaded on the second gate line G2 electrically connected to the row of sub-pixels, and the data signal is loaded on each data line DA so as to make second reflective electrodes 110-2 in the row of sub-pixels input the data signal.

It should be noted that when the gate opening signal is loaded on the first gate line G1, first transistors T1 may be controlled to be turned on. When the gate closing signal is loaded on the first gate line G1, the first transistors T1 may be controlled to be turned off. When the first transistors T1 are N-type transistors, the gate opening signal may be a high-level signal, and the gate closing signal may be a low-level signal. When the first transistors T1 are P-type transistors, the gate opening signal may be a low-level signal, and the gate closing signal may be a high-level signal.

It should be noted that when the gate opening signal is loaded on the second gate line G2, second transistors T2 may be controlled to be turned on. When the gate closing signal is loaded on the second gate line G2, the second transistors T2 may be controlled to be turned off. When the second transistors T2 are N-type transistors, the gate opening signal may be a high-level signal, and the gate closing signal may be a low-level signal. When the second transistors T2 are P-type transistors, the gate opening signal may be a low-level signal, and the gate closing signal may be a high-level signal.

Figure 9:
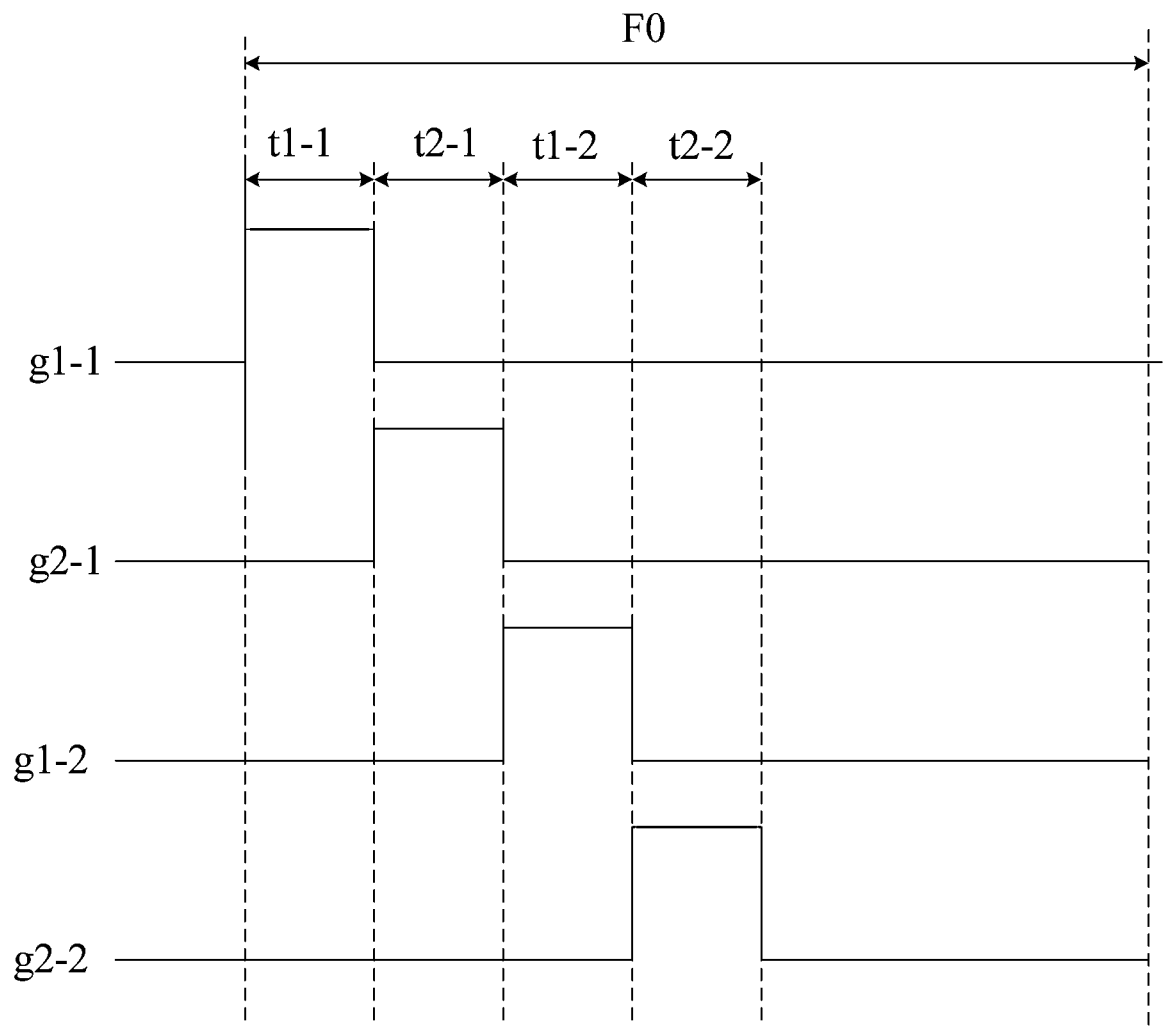
FIG. 9 is a signal timing diagram provided by an embodiment of the present disclosure.

The structures of the first reflective electrode 110-1 and the second reflective electrode 110-2 shown in FIG. 5B are taken as an example, and a working process of the above-mentioned display panel provided by the embodiments of the present disclosure will be described with reference to FIG. 1 and FIG. 9.

One frame of display time may include: a data input stage t1-y and a data input stage t2-y, where 1≤y≤Y, Y is the total quantity of the first gate lines G1 in the display panel, y and Y are both integers. In the data input stage t1-y, the gate opening signal is input to the first gate line G1 electrically connected to a y-th row of sub-pixels. In the data input stage t2-y, the gate opening signal is input to the second gate line G2 electrically connected to the y-th row of sub-pixels. The following description takes a first row of sub-pixels and a second row of sub-pixels as an example.

g1-1 is a signal input from the first gate line G1 electrically connected to the first row of sub-pixels, and g2-1 is a signal input from the second gate line G2 electrically connected to the first row of sub-pixels. g1-2 is a signal input from the first gate line G1 electrically connected to the second row of sub-pixels, and g2-2 is a signal input from the second gate line G2 electrically connected to the second row of sub-pixels.

In the data input stage t1-1, a low-level signal is input to the second gate line G2 electrically connected to the first row of sub-pixels so as to control the second transistors T2 in the first row of sub-pixels to be turned off. A low-level signal is input to the first gate line G1 electrically connected to the second row of sub-pixels so as to control the first transistors T1 in the second row of sub-pixels to be turned off. A low-level signal is input to the second gate line G2 electrically connected to the second row of sub-pixels so as to control the second transistors T2 in the second row of sub-pixels to be turned off. A high-level signal is input to the first gate line G1 electrically connected to the first row of sub-pixels so as to control the first transistors T1 in the first row of sub-pixels to be turned on. In addition, the data signal is loaded on each data line DA, so that the data signal is input to the first reflective electrodes 110-1 in the first row of sub-pixels.

In the data input stage t2-1, a low-level signal is input to the first gate line G1 electrically connected to the first row of sub-pixels so as to control the first transistors T1 in the first row of sub-pixels to be turned off. A low-level signal is input to the first gate line G1 electrically connected to the second row of sub-pixels so as to control the first transistors T1 in the second row of sub-pixels to be turned off. A low-level signal is input to the second gate line G2 electrically connected to the second row of sub-pixels so as to control the second transistors T2 in the second row of sub-pixels to be turned off. A high-level signal is input to the second gate line G2 electrically connected to the first row of sub-pixels so as to control the second transistors T2 in the first row of sub-pixels to be turned on. In addition, the data signal is loaded on each data line DA, so that the data signal is input to the second reflective electrodes 110-2 in the first row of sub-pixels.

In the data input stage t1-2, a low-level signal is input to the second gate line G2 electrically connected to the second row of sub-pixels so as to control the second transistors T2 in the second row of sub-pixels to be turned off. A low-level signal is input to the first gate line G1 electrically connected to the first row of sub-pixels so as to control the first transistors T1 in the first row of sub-pixels to be turned off. A low-level signal is input to the second gate line G2 electrically connected to the first row of sub-pixels so as to control the second transistors T2 in the first row of sub-pixels to be turned off. A high-level signal is input to the first gate line G1 electrically connected to the second row of sub-pixels so as to control the first transistors T1 in the second row of sub-pixels to be turned on. In addition, the data signal is loaded on each data line DA, so that the data signal is input to the first reflective electrodes 110-1 in the second row of sub-pixels.

In the data input stage t2-2, a low-level signal is input to the first gate line G1 electrically connected to the second row of sub-pixels so as to control the first transistors T1 in the second row of sub-pixels to be turned off. A low-level signal is input to the first gate line G1 electrically connected to the first row of sub-pixels so as to control the first transistors T1 in the first row of sub-pixels to be turned off. A low-level signal is input to the second gate line G2 electrically connected to the first row of sub-pixels so as to control the second transistors T2 in the first row of sub-pixels to be turned off. A high-level signal is input to the second gate line G2 electrically connected to the second row of sub-pixels to control the second transistors T2 in the second row of sub-pixels to be turned on. In addition, the data signal is loaded on each data line DA, so that the data signal is input to the second reflective electrodes 110-2 in the second row of sub-pixels.

Other processes are analogized successively, and are not repeated herein.

Exemplarily, a red sub-pixel is taken as an example for description. When the display panel is in a reflective mode, a backlight source is turned off, and the reflective electrodes reflect the external ambient light, so that the display panel displays. If a data signal input from the reflective electrodes in a first partition Q-1 and a second partition Q-2 cannot control liquid crystal molecules to flip within one frame of display time, neither the first partition Q-1 nor the second partition Q-2 emit light, and then red is used as a first gray scale H1. If a data signal input from the first reflective electrode 110-1 in the first partition Q-1 can control the liquid crystal molecules to flip and a data signal input from the second reflective electrode 110-2 in the second partition Q-2 cannot control driving molecules to flip within one frame of display time, the first reflective electrode 110-1 in the first partition Q-1 may reflect the incident light, so that only the first partition Q-1 emits light, and then red is used as a second gray scale H2. If a data signal input from the first reflective electrode 110-1 in the first partition Q-1 cannot control the driving molecules to flip and a data signal input from the second reflective electrode 110-2 in the second partition Q-2 can control the driving molecules to flip within one frame of display time, the second reflective electrode 110-2 in the second partition Q-2 may reflect the incident light, so that only the second partition Q-2 emits light, and then red is used as a third gray scale H3. If a data signal input from the first reflective electrode 110-1 in the first partition Q-1 can control the driving molecules to flip and a data signal input from the second reflective electrode 110-2 in the second partition Q-2 can also control the driving molecules to flip within one frame of display time, the first reflective electrode 110-1 in the first partition Q-1 may reflect the incident light, and the second reflective electrode 110-2 in the second partition Q-2 may also reflect the incident light, so that both the first partition Q-1 and the second partition Q-2 emit light, and then red is used as a fourth gray scale H4. H1<H2<H3<H4. That is, H1 may be the lowest gray scale of red, and H4 may be the highest gray scale of red. Therefore, in one pixel unit, a red part may have four gray scales from a dark state to a bright state. Similarly, in one pixel unit, a green part may also have four gray scales from the dark state to the bright state, and a blue part may also have four gray scales from the dark state to the bright state. In this way, one pixel unit may display 64 gray scales of color.

Exemplarily, a red sub-pixel is taken as an example for description. When the display panel is in a transmission mode, the backlight source works, and through holes transmit the light emitted by the backlight source to enable the display panel to display. If a data signal input from the reflective electrodes in the first partition Q-1 and the second partition Q-2 cannot control the liquid crystal molecules to flip within one frame of display time, neither the first partition Q-1 nor the second partition Q-2 emit light, and then red is used as the first gray scale H1. If a data signal input from the first reflective electrode 110-1 in the first partition Q-1 can control the driving molecules to flip and a data signal input from the second reflective electrode 110-2 in the second partition Q-2 cannot control the driving molecules to flip within one frame of display time, the light of the backlight source may penetrate through the first through hole 111 and is emitted by the first partition Q-1, so that only the first partition Q-1 emits light, and then red is used as the second gray scale H2. If a data signal input from the first reflective electrode 110-1 in the first partition Q-1 cannot control the driving molecules to flip and a data signal input from the second reflective electrode 110-2 in the second partition Q-2 can control the driving molecules to flip within one frame of display time, the light of the backlight source may penetrate through the second through hole 112 and is emitted by the second partition Q-2, so that only the second partition Q-2 emits light, and then red is used as the third gray scale H3. If a data signal input from the first reflective electrode 110-1 in the first partition Q-1 can control the driving molecules to flip and a data signal input from the second reflective electrode 110-2 in the second partition Q-2 can also control the driving molecules to flip within one frame of display time, the light of the backlight source may penetrate through the first through hole 111 and is emitted by the first partition Q-1, and the light of the backlight source may penetrate through the second through hole 112 and is emitted by the second partition Q-2, so that both the first partition Q-1 and the second partition Q-2 emit light, and then red is used as the fourth gray scale H4. H1<H2<H3<H4. That is, H1 may be the lowest gray scale of red, and H4 may be the highest gray scale of red. Therefore, in one pixel unit, the red part may have four gray scales from the dark state to the bright state. Similarly, in one pixel unit, the green part may also have four gray scales from the dark state to the bright state, and the blue part may also have four gray scales from the dark state to the bright state. In this way, one pixel unit may display 64 gray scales of color.

Figure 10A:
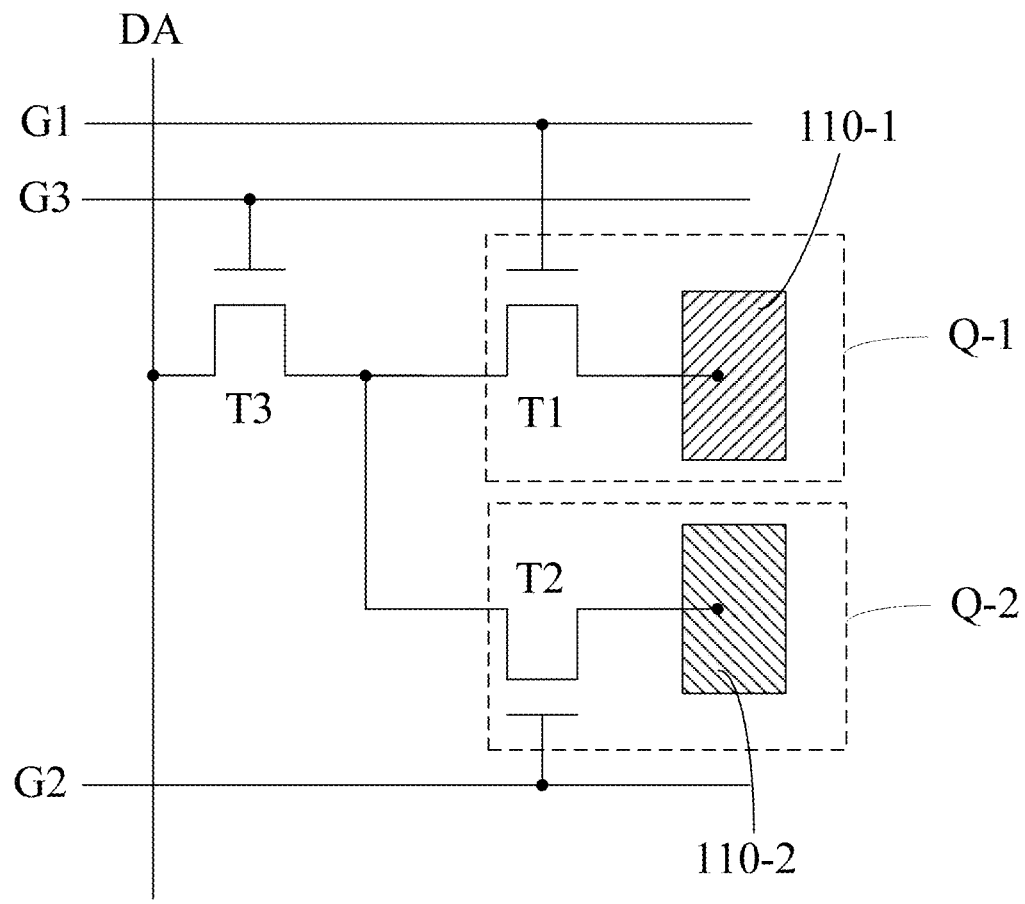
FIG. 10A is a diagram of some other equivalent circuits in a sub-pixel of a display panel provided by an embodiment of the present disclosure.
Figure 10B:
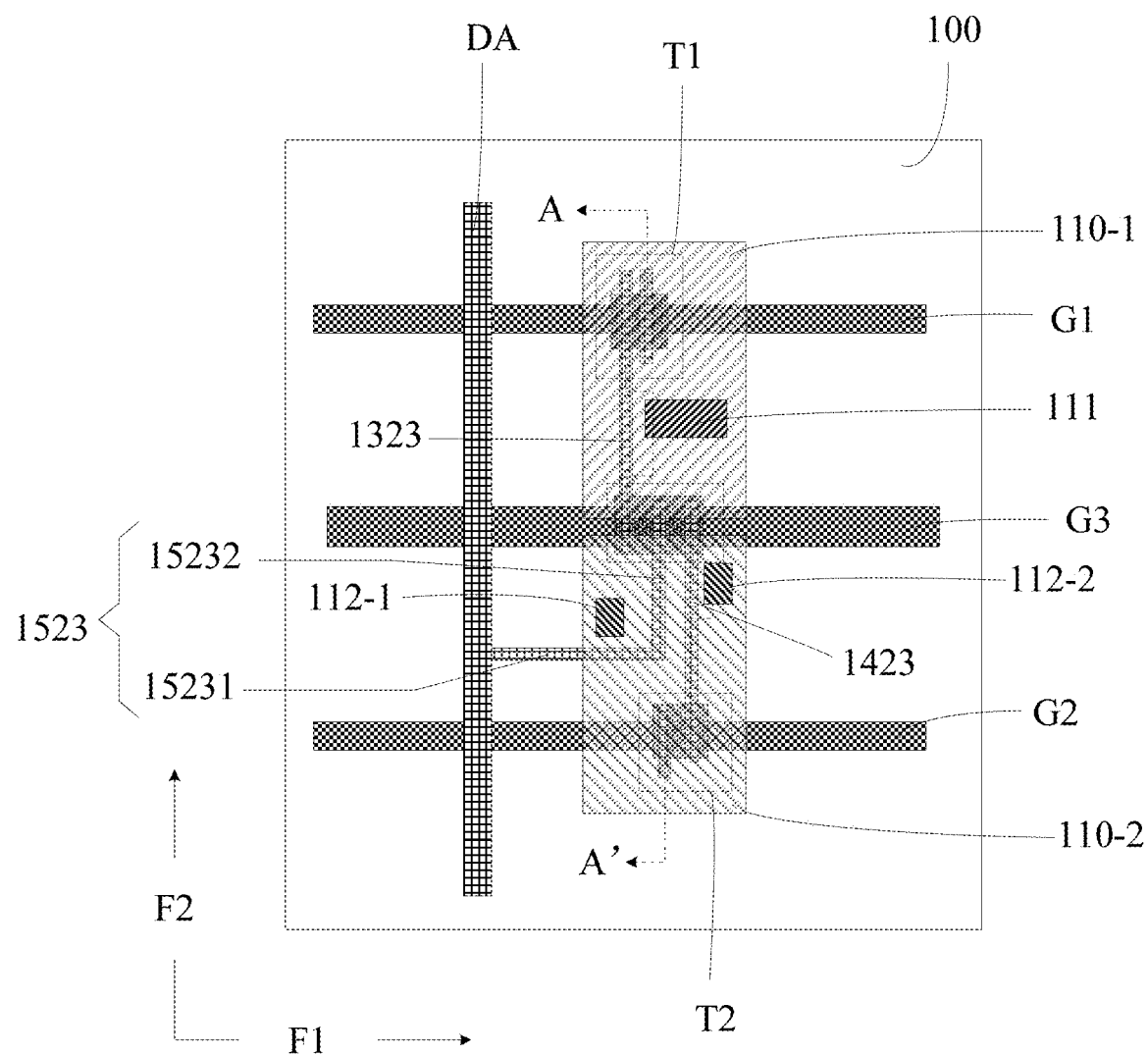
FIG. 10B is a schematic diagram of some other layout structures in a sub-pixel of a display panel provided by an embodiment of the present disclosure.
Figure 10C:
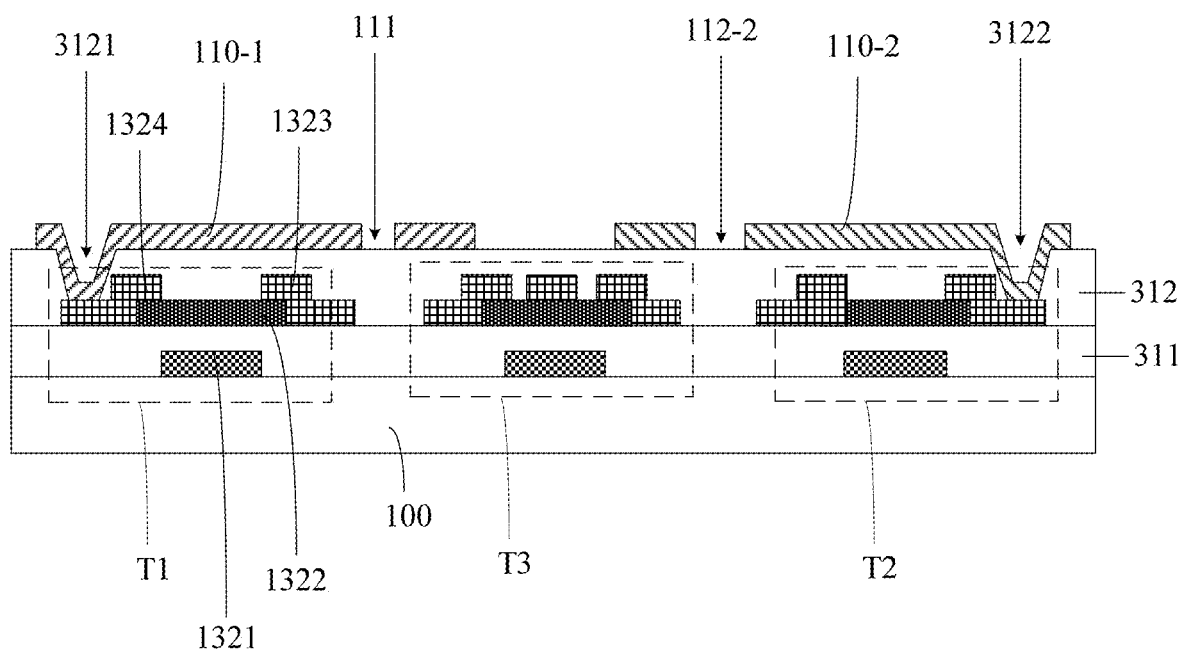
FIG. 10C is a schematic diagram of a cross-sectional structure of the display panel shown in FIG. 10B in an AA' direction.

Embodiments of the present disclosure also provide some display panels, schematic structural diagrams of which are shown in FIG. 10A to FIG. 10C, which are modified from the implementation of the above-mentioned embodiments. Only the differences between the present embodiments and the above-mentioned embodiment will be described below, and the similarities will not be repeated herein.

During specific implementation, in the embodiments of the present disclosure, as shown in FIG. 10A and FIG. 10B, a gate conductive layer further includes a plurality of third gate lines G3 disposed at intervals; the display panel may further include: a plurality of third transistors T3 disposed at intervals; an orthographic projection of one third transistor T3 on the base substrate 100 is located in one sub-pixel; and gates of the third transistors T3 in a row of sub-pixels are electrically connected to the same third gate line G3. In addition, in the same sub-pixel, a first source portion 1323 and a second source portion 1423 are electrically connected with a source connection portion 1523 through the third transistor T3.

Exemplarily, one first partition Q-1 may further be provided with a first transistor T1, and one second partition Q-2 may further be provided with a second transistor T2. One sub-pixel further includes the third transistor T3. That is, one first partition Q-1 and one second partition Q-2 share one third transistor T3. In addition, one row of sub-pixels is electrically connected to one first gate line G1, one second gate line G2 and one third gate line G3, and one column of sub-pixels is electrically connected to one data line DA.

Specifically, as shown in FIGS. 10A to 10C, in the same sub-pixel, the first transistor T1 and the second transistor T2 are electrically connected to the data line DA through the third transistor T3. For example, each sub-pixel may include the first transistor T1, the second transistor T2 and the third transistor T3.

A gate of the first transistor T1 is electrically connected with the first gate line G1, a first electrode of the first transistor T1 is electrically connected with a second electrode of the third transistor T3, and a second electrode of the first transistor T1 is electrically connected with a first reflective electrode 110-1.

A gate of the second transistor T2 is electrically connected with the second gate line G2, a first electrode of the second transistor T2 is electrically connected with the second electrode of the third transistor T3, and a second electrode of the second transistor T2 is electrically connected with a second reflective electrode 110-2.

The gate of the third transistor T3 is electrically connected with the third gate line G3, and a first electrode of the third transistor T3 is electrically connected with the data line DA.

It should be noted that when a gate opening signal is loaded on the third gate line G3, the third transistor T3 may be controlled to be turned on. When a gate closing signal is loaded on the third gate line G3, the third transistor T3 may be controlled to be turned off. When the third transistor T3 is an N-type transistor, the gate opening signal may be a high-level signal, and the gate closing signal may be a low-level signal. When the third transistor T3 is a P-type transistor, the gate opening signal may be a low-level signal, and the gate closing signal may be a high-level signal.

It should be noted that when both the first transistor T1 and the third transistor T3 are turned on, a data signal transmitted on the data line may be provided to the first reflective electrode 110-1. In this way, the first transistor T1 and the third transistor T3 may be combined into a double-gate TFT, so that the on-state current of the TFT can be increased, the off-state current of the TFT can be reduced, and the power consumption can be reduced.

It should be noted that when both the second transistor T2 and the third transistor T3 are turned on, the data signal transmitted on the data line may be provided to the second reflective electrode 110-2. In this way, the second transistor T2 and the third transistor T3 may be combined into a double-gate TFT, so that the on-state current of the TFT can be increased, the off-state current of the TFT can be reduced, and the power consumption can be reduced.

It should be noted that structures of the third transistor T3 may refer to the structures of the first transistor T1, which is not repeated herein.

During specific implementation, in the embodiments of the present disclosure, as shown in FIG. 10B, an orthographic projection of the third gate line G3 on the base substrate 100 and orthographic projections of the third transistor T3, the first reflective electrode 110-1 and the second reflective electrode 110-2 that are electrically connected on the base substrate 100 have an overlapping region, and orthographic projections of a first through hole 111 and a second through hole 112 on the base substrate 100 do not overlap orthographic projections of a source conductive layer and a gate conductive layer on the base substrate 100. In this way, the third gate line G3 and the third transistor T3 are prevented from shielding the first through hole 111 and the second through hole 112, and the influence of the third gate line G3 and the third transistor T3 on the display effect is reduced.

Further, during specific implementation, in the embodiments of the present disclosure, as shown in FIG. 10B, the orthographic projection of the first through hole 111 on the base substrate 100 overlaps orthographic projections of the first transistor T1 and the third transistor T3 on the base substrate 100. In this way, the first transistor T1 and the third transistor T3 are prevented from shielding the first through hole 111, and the influence of the first transistor T1 and the third transistor T3 on the display effect is reduced.

Further, during specific implementation, in the embodiments of the present disclosure, as shown in FIG. 10B, the orthographic projection of the second through hole 112 on the base substrate 100 overlaps orthographic projections of the second transistor T2 and the third transistor T3 on the base substrate 100. In this way, the second transistor T2 and the third transistor T3 are prevented from shielding the second through hole 112, and the influence of the second transistor T2 and the third transistor T3 on the display effect is reduced.

Exemplarily, when the second through hole 112 includes a first sub-through hole 112-1 and a second sub-through hole 112-2, during specific implementation, in the embodiments of the present disclosure, as shown in FIG. 10B, for the second gate line G2, the third gate line G3, the first sub-through hole 112-1 and the second sub-through hole 112-2 electrically connected to the same row of sub-pixels, orthographic projections of the first sub-through hole 112-1 and the second sub-through hole 112-2 on the base substrate 100 are located between orthographic projections of the second gate line G2 and the third gate line G3 on the base substrate 100.

Exemplarily, during specific implementation, in the embodiments of the present disclosure, as shown in FIG. 10B, for one sub-pixel, the orthographic projection of the first sub-through hole 112-1 on the base substrate 100 is closer to an orthographic projection of the data line DA on the base substrate 100 than the orthographic projection of the second sub-through hole 112-2 on the base substrate 100. Exemplarily, in each sub-pixel, the orthographic projection of the first sub-through hole 112-1 on the base substrate 100 may be closer to the orthographic projection of the data line DA on the base substrate 100 than the orthographic projection of the second sub-through hole 112-2 on the base substrate 100.

Exemplarily, during specific implementation, in the embodiments of the present disclosure, as shown in FIG. 10B, for one sub-pixel, the orthographic projection of the second sub-through hole 112-2 on the base substrate 100 is far away from the orthographic projection of the data line DA on the base substrate 100 than the orthographic projection of the first sub-through hole 112-1 on the base substrate 100. Exemplarily, in each sub-pixel, the orthographic projection of the second sub-through hole 112-2 on the base substrate 100 may be far away from the orthographic projection of the data line DA on the base substrate 100 than the orthographic projection of the first sub-through hole 112-1 on the base substrate 100.

It should be noted that, for one sub-pixel, by disposing the first sub-through hole 112-1 close to the data line DA electrically connected to the sub-pixel and disposing the second sub-through hole 112-2 away from the data line DA of the sub-pixel, the first sub-through hole 112-1 and the second sub-through holes 112-2 in the second partition Q-2 may be dispersedly disposed, so that the first sub-through hole 112-1 and the second sub-through holes 112-2 are flexibly disposed according to a space in the second partition Q-2.

Exemplarily, as shown in FIG. 10B, in the same row of sub-pixels, the orthographic projection of the third gate line G3 on the base substrate 100 is located between an orthographic projection of the first gate line G1 on the base substrate 100 and the orthographic projection of the second gate line G2 on the base substrate 100.

Exemplarily, as shown in FIG. 10B, the source connection portion 1523 may include: a first sub-source connection portion 15231 and a second sub-source connection portion 15232 electrically connected to each other; the first sub-source connection portion 15231 extends in the first direction F1, and the second sub-source connection portion 15232 extends in the second direction F2; and the first sub-source connection portion 15231 is electrically connected with the data line DA, and the second sub-source connection portion 15232 is electrically connected with the third transistor T3. In this way, the source connection portion 1523 may be arranged in a zigzag shape. Of course, the present disclosure includes, but is not limited to, this.

Exemplarily, as shown in FIG. 10B, the orthographic projection of the first sub-through hole 112-1 on the base substrate 100 may be located between an orthographic projection of the first sub-source connection portion 15231 on the base substrate 100 and the orthographic projection of the data line DA on the base substrate 100, and the orthographic projection of the first sub-through hole 112-1 on the base substrate 100 is located between an orthographic projection of the second sub-source connection portion 15232 on the base substrate 100 and the orthographic projection of the third gate line G3 on the base substrate 100.

An embodiment of the present disclosure further provides a driving method of the above-mentioned display panel. While loading a gate opening signal on a first gate line G1 electrically connected to a row of sub-pixels, the method may further include: the gate opening signal is loaded on a third gate line G3 electrically connected to the row of sub-pixels. While the gate opening signal is loaded on a second gate line G2 electrically connected to the row of sub-pixels, the method may further include: the gate opening signal is loaded on the third gate line G3 electrically connected to the row of sub-pixels.

Figure 11:
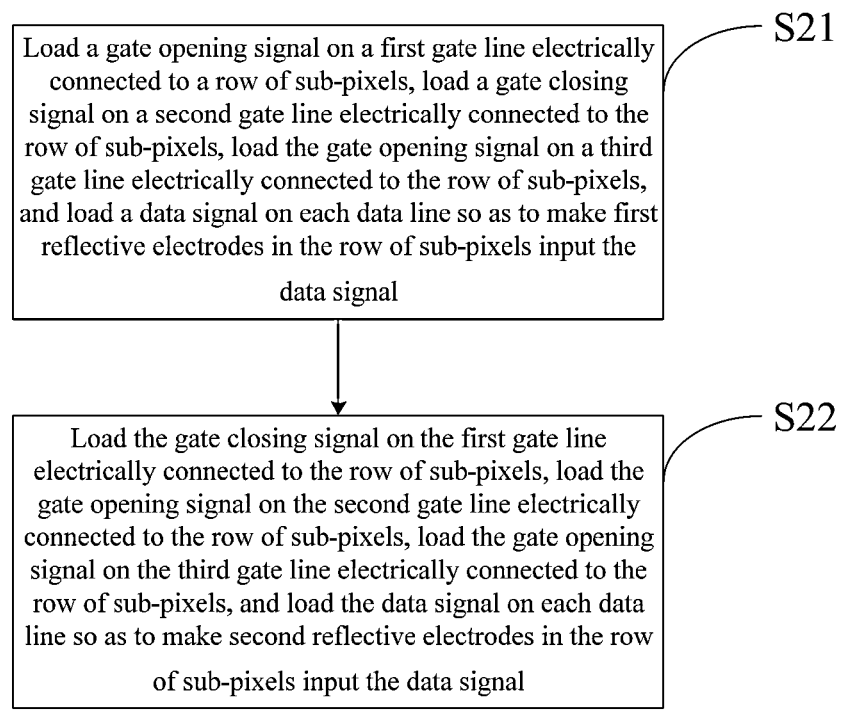
FIG. 11 is a flow diagram of some other driving methods provided by an embodiment of the present disclosure.

As shown in FIG. 11, the driving method of the above-mentioned display panel provided by the embodiment of the present disclosure may include the following operations.

S21, the gate opening signal is loaded on the first gate line G1 electrically connected to the row of sub-pixels, a gate closing signal is loaded on the second gate line G2 electrically connected to the row of sub-pixels, the gate opening signal is loaded on the third gate line G3 electrically connected to the row of sub-pixels, and a data signal is loaded on each data line DA so as to make first reflective electrodes 110-1 in the row of sub-pixels input the data signal.

S22, the gate closing signal is loaded on the first gate line G1 electrically connected to the row of sub-pixels, the gate opening signal is loaded on the second gate line G2 electrically connected to the row of sub-pixels, the gate opening signal is loaded on the third gate line G3 electrically connected to the row of sub-pixels, and the data signal is loaded on each data line DA so as to make second reflective electrodes 110-2 in the row of sub-pixels input the data signal.

Figure 12:
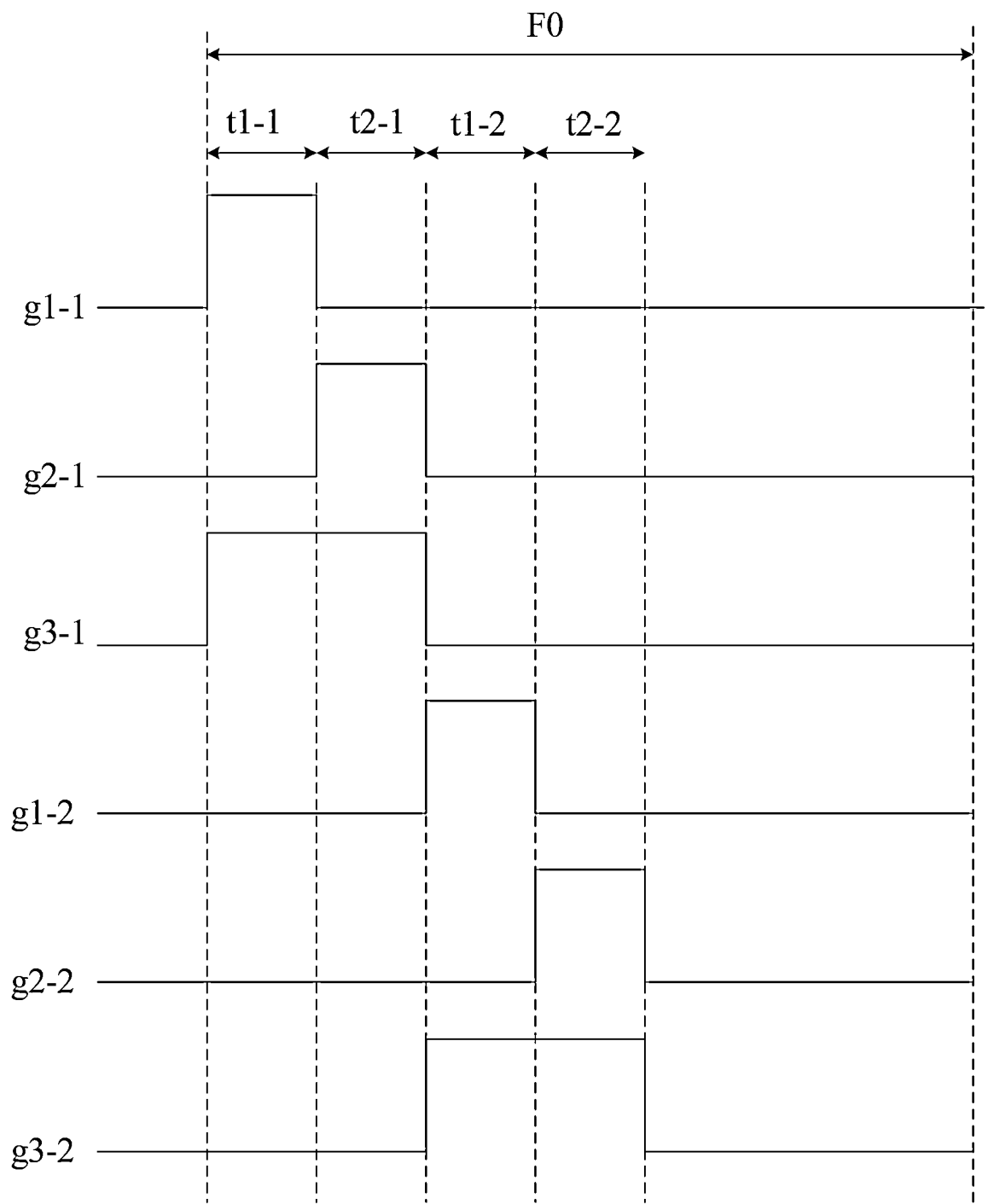
FIG. 12 is some other signal timing diagrams provided by an embodiment of the present disclosure.

The structures of the first reflective electrode 110-1 and the second reflective electrode 110-2 shown in FIG. 5B are taken as an example, and a working process of the above-mentioned display panel provided by the embodiments of the present disclosure will be described with reference to FIG. 1 and FIG. 12.

One frame of display time may include: a data input stage t1-$y$ and a data input stage t2-$y$, where $1 \leq y \leq Y$, Y is the total quantity of the first gate lines G1 in the display panel, y and Y are both integers). In the data input stage t1-$y$, the gate opening signal is input to the first gate line G1 and the third gate line G3 electrically connected to a y-th row of sub-pixels. In the data input stage t2-$y$, the gate opening signal is input to the second gate line G2 and the third gate line G3 electrically connected to the y-th row of sub-pixels. The following description takes a first row of sub-pixels and a second row of sub-pixels as an example.

g1-1 is a signal input from the first gate line G1 electrically connected to the first row of sub-pixels, and g2-1 is a signal input from the second gate line G2 electrically connected to the first row of sub-pixels. g3-1 is a signal input from the third gate line G3 electrically connected to the first row of sub-pixels. g1-2 is a signal input from the first gate line G1 electrically connected to the second row of sub-pixels, and g2-2 is a signal input from the second gate line G2 electrically connected to the second row of sub-pixels. g3-2 is a signal input from the third gate line G3 electrically connected to the second row of sub-pixels.

In the data input stage t1-1, a low-level signal is input to the second gate line G2 electrically connected to the first row of sub-pixels so as to control second transistors T2 in the first row of sub-pixels to be turned off. A low-level signal is input to the first gate line G1 electrically connected to the second row of sub-pixels so as to control first transistors T1 in the second row of sub-pixels to be turned off. A low-level signal is input to the second gate line G2 electrically connected to the second row of sub-pixels so as to control second transistors T2 in the second row of sub-pixels to be turned off. A low-level signal is input to the third gate line G3 electrically connected to the second row of sub-pixels so as to control third transistors T3 in the second row of sub-pixels to be turned off. A high-level signal is input to the first gate line G1 electrically connected to the first row of sub-pixels so as to control first transistors T1 in the first row of sub-pixels to be turned on. A high-level signal is input to the third gate line G3 electrically connected to the first row of sub-pixels so as to control third transistors T3 in the first row of sub-pixels to be turned on. In addition, the data signal is loaded on each data line DA, so that the data signal is input to the first reflective electrodes 110-1 in the first row of sub-pixels.

In the data input stage t2-1, a low-level signal is input to the first gate line G1 electrically connected to the first row of sub-pixels so as to control the first transistors T1 in the first row of sub-pixels to be turned off. A low-level signal is input to the first gate line G1 electrically connected to the second row of sub-pixels so as to control the first transistors T1 in the second row of sub-pixels to be turned off. A low-level signal is input to the second gate line G2 electrically connected to the second row of sub-pixels so as to control the second transistors T2 in the second row of sub-pixels to be turned off. A low-level signal is input to the third gate line G3 electrically connected to the second row of sub-pixels so as to control the third transistors T3 in the second row of sub-pixels to be turned off. A high-level signal is input to the second gate line G2 electrically connected to the first row of sub-pixels so as to control the second transistors T2 in the first row of sub-pixels to be turned on. A high-level signal is input to the third gate line G3 electrically connected to the first row of sub-pixels so as to control the third transistors T3 in the first row of sub-pixels to be turned on. In addition, the data signal is loaded on each data line DA, so that the data signal is input to the second reflective electrodes 110-2 in the first row of sub-pixels.

In the data input stage t1-2, a low-level signal is input to the second gate line G2 electrically connected to the second row of sub-pixels so as to control the second transistors T2 in the second row of sub-pixels to be turned off. A low-level signal is input to the first gate line G1 electrically connected to the first row of sub-pixels so as to control the first transistors T1 in the first row of sub-pixels to be turned off. A low-level signal is input to the second gate line G2 electrically connected to the first row of sub-pixels so as to control the second transistors T2 in the first row of sub-pixels to be turned off. A low-level signal is input to the third gate line G3 electrically connected to the first row of sub-pixels so as to control the third transistors T3 in the first row of sub-pixels to be turned off. A high-level signal is input to the first gate line G1 electrically connected to the second row of sub-pixels so as to control the first transistors T1 in the second row of sub-pixels to be turned on. A high-level signal is input to the third gate line G3 electrically connected to the second row of sub-pixels so as to control the third transistors T3 in the second row of sub-pixels to be turned on. In addition, the data signal is loaded on each data line DA, so that the data signal is input to the first reflective electrodes 110-1 in the second row of sub-pixels.

In the data input stage t2-2, a low-level signal is input to the first gate line G1 electrically connected to the second row of sub-pixels so as to control the first transistors T1 in the second row of sub-pixels to be turned off. A low-level signal is input to the first gate line G1 electrically connected to the first row of sub-pixels so as to control the first transistors T1 in the first row of sub-pixels to be turned off. A low-level signal is input to the second gate line G2 electrically connected to the first row of sub-pixels so as to control the second transistors T2 in the first row of sub-pixels to be turned off. A low-level signal is input to the third gate line G3 electrically connected to the first row of sub-pixels so as to control the third transistors T3 in the first row of sub-pixels to be turned off. A high-level signal is input to the second gate line G2 electrically connected to the second row of sub-pixels so as to control the second transistors T2 in the second row of sub-pixels to be turned on. A high-level signal is input to the third gate line G3 electrically connected to the second row of sub-pixels so as to control the third transistors T3 in the second row of sub-pixels to be turned on. In addition, the data signal is loaded on each data line DA, so that the data signal is input to the second reflective electrodes 110-2 in the second row of sub-pixels.

Other processes are analogized successively, and are not repeated herein.

It should be noted that the principle that the above-mentioned display panel provided by the embodiment of the present disclosure can realize 64 gray scales is basically the same as that of the above-mentioned embodiment, and will not be repeated herein.

Figure 13:
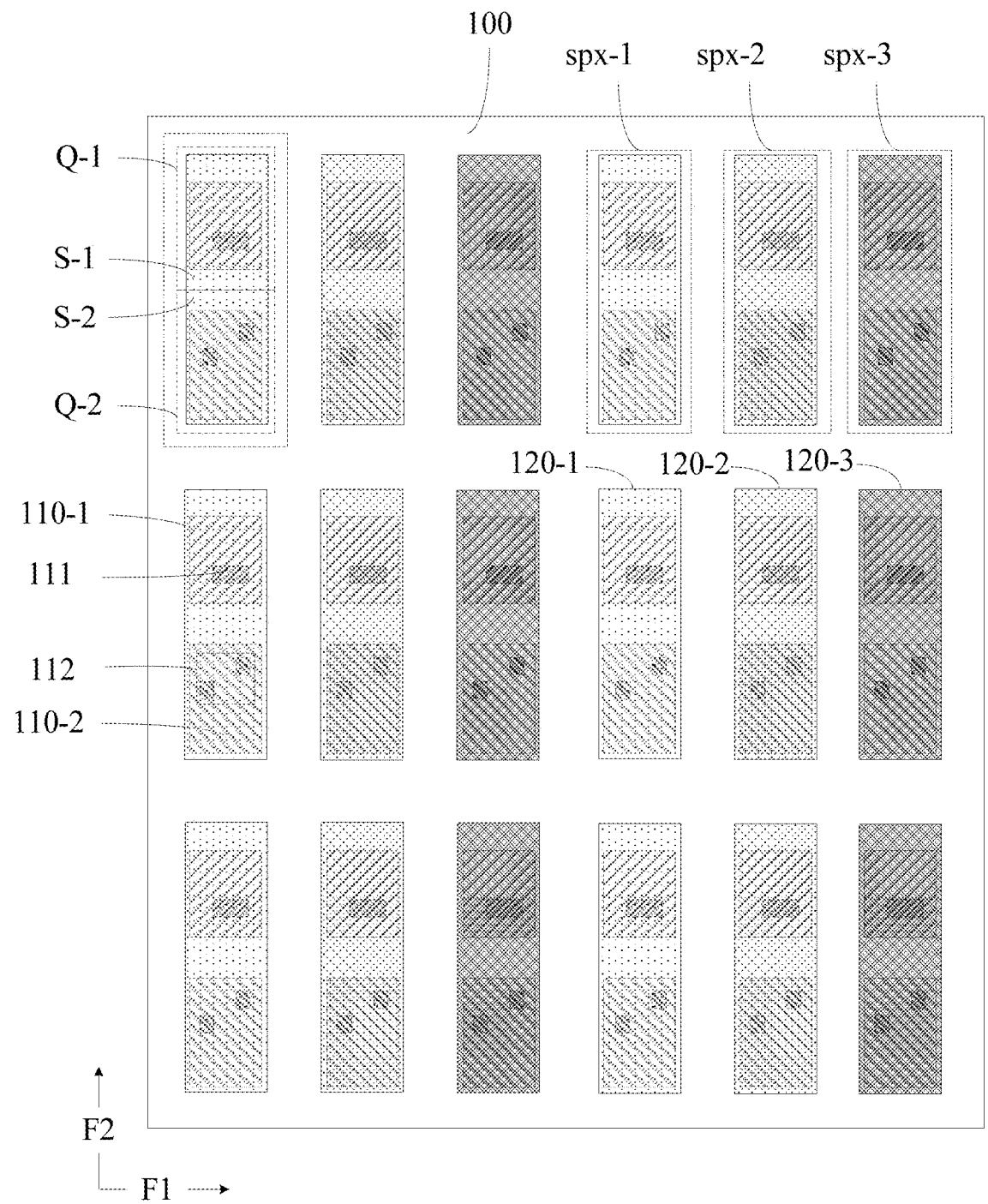
FIG. 13 is a schematic diagram of some other top-view structures of a display panel provided by an embodiment of the present disclosure.

Embodiments of the present disclosure further provide some display panels, schematic structural diagrams of which are shown in FIG. 13, which are modified from the implementation of the above-mentioned embodiments. Only the differences between the present embodiments and the above-mentioned embodiments will be described below, and the similarities will not be repeated herein.

During specific implementation, in the embodiments of the present disclosure, in the same sub-pixel, an area of a first reflective electrode 110-1 may be smaller than an area of a second reflective electrode 110-2, and an area of a first sub-color resist region S-1 is approximately equal to an area of a second sub-color resist region S-2. Exemplarily, as shown in FIG. 13, in each first-color sub-pixel spx-1, the area of the first reflective electrode 110-1 is smaller than that of the second reflective electrode 110-2, and the area of the first sub-color resist region S-1 is approximately equal to the area of the second sub-color resist region S-2. In each second-color sub-pixel spx-2, the area of the first reflective electrode 110-1 is smaller than that of the second reflective electrode 110-2, and the area of the first sub-color resist region S-1 is approximately equal to the area of the second sub-color resist region S-2. In each third-color sub-pixel spx-3, the area of the first reflective electrode 110-1 is smaller than that of the second reflective electrode 110-2, and the area of the first sub-color resist region S-1 is approximately equal to the area of the second sub-color resist region S-2.

It should be noted that when the display panel is in a reflective mode, since the area of the first reflective electrode 110-1 is smaller than that of the second reflective electrode 110-2, the brightness of a first partition Q-1 may be made smaller than the brightness of a second partition Q-2, and accordingly the display panel can achieve 64 gray scales. Exemplarily, one red sub-pixel is taken as an example for description. When the display panel is in the reflective mode, a backlight source is turned off, and the reflective electrodes reflect the external ambient light, so that the display panel displays. If neither the first partition Q-1 nor the second partition Q-2 emits light within one frame of display time, then red is used as a first gray scale H1. If only the first partition Q-1 emits light within one frame of display time, then red is used as a second gray scale H2. If only the second partition Q-2 emits light within one frame of display time, then red is used as a third gray scale H3. If both the first partition Q-1 and the second partition Q-2 emit light within one frame of display time, then red is used as a fourth gray scale H4. H1<H2<H3<H4. That is, H1 may be the lowest gray scale of red, and H4 may be the highest gray scale of red. Therefore, in one pixel unit, a red part may have four gray scales from a dark state to a bright state. Similarly, in one pixel unit, a green part may also have four gray scales from the dark state to the bright state, and a blue part may also have four gray scales from the dark state to the bright state. In this way, one pixel unit may display 64 gray scales of color.

During specific implementation, in the same sub-pixel, an area of a first through hole 111 and an area of a second through hole 112 may be approximately the same, so that light intensities of light passing through the first through hole 111 and the second through hole 112 are approximately the same.

During specific implementation, in the same sub-pixel, the area of the second through hole 112 may be Y times the area of the first through hole 111. In this way, the light intensity of light passing through the first through hole 111 may be made smaller than the light intensity of light passing through the second through hole 112.

During specific implementation, in the same sub-pixel, the area of the first through hole 111 may be Y times the area of the second through hole 112. In this way, the light intensity of light passing through the first through hole 111 may be made greater than the light intensity of light passing through the second through hole 112.

It should be noted that when the display panel is in a transmission mode, since the area of the first reflective electrode 110-1 and the area of the second reflective electrode 110-2 are different, the brightness of a first reflective region and the brightness of a second reflective region are different, so that the display panel can realize 64 gray scales. Exemplarily, one red sub-pixel is taken as an example for description. When the display panel is in the transmission mode, the backlight source works, and the through holes transmit the light emitted by the backlight source to enable the display panel to display. If neither the first partition Q-1 nor the second partition Q-2 emits light within one frame of display time, then red is used as the first gray scale H1. If only the first partition Q-1 emits light within one frame of display time, then red is used as the second gray scale H2. If only the second partition Q-2 emits light within one frame of display time, then red is used as the third gray scale H3. If both the first partition Q-1 and the second partition Q-2 emit light within one frame of display time, then red is used as the fourth gray scale H4. H1<H2<H3<H4. That is, H1 may be the lowest gray scale of red, and H4 may be the highest gray scale of red. Therefore, in one pixel unit, the red part may have four gray scales from the dark state to the bright state. Similarly, in one pixel unit, the green part may also have four gray scales from the dark state to the bright state, and the blue part may also have four gray scales from the dark state to the bright state. In this way, one pixel unit may display 64 gray scales of color.

It should be noted that a working process of the display panel in the embodiment may refer to the working process of the display panel in the above-mentioned embodiments, and is not repeated in detail herein.

Based on the same inventive concept, an embodiment of the present disclosure further provides a display device, including the above-mentioned display panel provided by the embodiments of the present disclosure. The problem-solving principle of the display device is similar to that of the above-mentioned display panel. Therefore, the implementation of the display device may refer to the above-mentioned implementation of the display panel, and the repetition is not repeated herein.

During specific implementation, in the embodiments of the present disclosure, the display device may further include a backlight source. The backlight source may be located on a side of a base substrate facing away from an opposite substrate. The backlight source may be a direct-type backlight source or an edge-type backlight source, and a specific setting mode may be designed and determined according to the practical application environments, which is not limited herein.

During specific implementation, in the embodiments of the present disclosure, the display device may be any product or component with a display function, such as a mobile phone, a tablet computer, a television, a displayer, a notebook computer, a digital photo frame, and a navigator. Other essential components of the display apparatus should be understood by those ordinarily skilled in the art, and will not be described in detail herein, nor should it be regarded as a limitation of the present disclosure.

In the above-mentioned display panel and the driving method thereof, and the display device provided by the embodiments of the present disclosure, the sub-pixels are provided with the partitions, the reflective electrodes are disposed in the partitions, and the through holes are disposed in the reflective electrodes. When the external ambient light is strong, the display panel may be in the reflective mode, so that the external ambient light may be reflected by the reflective electrodes to provide the light source for the display panel, the display panel displays the image, and at this time, the backlight source may be turned off to reduce power consumption. In an environment with no external light or weak light, the display panel may be in the transmission mode, and by operating the backlight source, light emitted from the backlight source passes through the through holes in the reflective electrodes to provide a light source for the display panel, so that the display panel displays the image. Therefore, the above-mentioned display panel provided by the embodiments of the present disclosure can realize the transflective display panel.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all variations and modifications that fall within the scope of the present disclosure.

It will be apparent to those skilled in the art that various modifications and variations can be made in the embodiments of the present disclosure without departing from the spirit or scope of the embodiments of the present disclosure. Thus, if these modifications and variations of the embodiments of the present disclosure fall within the scope of the claims of the present disclosure and its equivalent technology, the present disclosure is also intended to include these modifications and variations.

What is claimed is:

1. A display panel, comprising:
a base substrate; and
a plurality of sub-pixels, disposed on the base substrate, at least one of the plurality of sub-pixels comprising a reflective electrode;
wherein the reflective electrode comprises at least a first reflective electrode and a second reflective electrode insulated and spaced apart from each other, the first reflective electrode is provided with a first through hole, the second reflective electrode is provided with a second through hole;
wherein the base substrate has a first partition and a second partition, an orthographic projection of the first reflective electrode on the base substrate is located in the first partition, and an orthographic projection of the second reflective electrode on the base substrate is located in the second partition; and
the display panel further comprises:
an opposite substrate, disposed opposite to the base substrate; and
a color resist layer, located between the base substrate and the opposite substrate, and comprising a sub-color resist layer located in each sub-pixel;
wherein the sub-color resist layer comprises a first sub-color resist region and a second sub-color resist region, and in a direction perpendicular to a plane where the base substrate is located, the first partition covers the first sub-color resist region, and the second partition covers the second sub-color resist region;
wherein the sub-color resist layer located in the first partition is provided with a first via hole, and the first via hole penetrates through the sub-color resist layer; and
an orthographic projection of the first via hole on the base substrate and an orthographic projection of the first through hole on the base substrate do not overlap.

2. The display panel according to claim 1, wherein in the same sub-pixel, an area of the first through hole is different from an area of the second through hole.

3. The display panel according to claim 1, wherein in the same sub-pixel, a quantity of second through holes is different from a quantity of first through holes.

4. The display panel according to claim 1, wherein the first reflective electrode and the sub-color resist layer located in the first sub-color resist region have a first facing area;
the second reflective electrode and the sub-color resist layer located in the second sub-color resist region have a second facing area; and
in a same sub-pixel, the first facing area is different from the second facing area.

5. The display panel according to claim 4, wherein in the same sub-pixel, an area of the first reflective electrode and an area of the second reflective electrode are approximately the same, and an area of the first sub-color resist region is smaller than an area of the second sub-color resist region.

6. The display panel according to claim 5, wherein the plurality of sub-pixels comprise a first-color sub-pixel, a second-color sub-pixel, and a third-color sub-pixel;
an area of a first via hole in the second-color sub-pixel is greater than an area of a first via hole in the first-color sub-pixel; or,
an area of a first via hole in the first-color sub-pixel is greater than an area of a first via hole in the third-color sub-pixel.

7. The display panel according to claim 6, wherein the first-color sub-pixel has a first side and a second side opposite to each other; the first side and the second side are arranged in a first direction; the first via hole in the first-color sub-pixel comprises a first sub-via hole and a second sub-via hole; the first sub-via hole is located on the first side, and the second sub-via hole is located on the second side; or,
the second-color sub-pixel has a third side and a fourth side opposite to each other; the third side and the fourth side are arranged in the first direction; an orthographic projection of the first via hole in the second-color sub-pixel on the base substrate extends from the third side to the fourth side; or,
the third-color sub-pixel has a fifth side and a sixth side opposite to each other; the fifth side and the sixth side are arranged in the first direction; the first via hole in the third-color sub-pixel comprises a third sub-via hole and a fourth sub-via hole; and the third sub-via hole is located on the fifth side, and the fourth sub-via hole is located on the sixth side.

8. The display panel according to claim 7, wherein an area of the first sub-via hole and an area of the second sub-via hole are approximately the same; or,
an area of the third sub-via hole and an area of the fourth sub-via hole are approximately the same.

9. The display panel according to claim 7, wherein a center of the first via hole in the first-color sub-pixel, a center of the first via hole in the second-color sub-pixel, and a center of the first via hole in the third-color sub-pixel are arranged on a same straight line in the first direction.

10. The display panel according to claim 4, wherein in the same sub-pixel, an area of the first reflective electrode is smaller than an area of the second reflective electrode, and an area of the first sub-color resist region is smaller than or approximately equal to an area of the second sub-color resist region.

11. The display panel according to claim 1, wherein the display panel further comprises:
a first planarization layer, located between a layer where the reflective electrode is located and the base substrate;
a source conductive layer, located between the first planarization layer and the base substrate, and comprising a plurality of data lines disposed at intervals;
a gate insulating layer, located between the source conductive layer and the base substrate; and
a gate conductive layer, located between the gate insulating layer and the base substrate, and comprising a plurality of first gate lines and a plurality of second gate lines disposed at intervals; and
the display panel further comprises: a plurality of first transistors and a plurality of second transistors disposed at intervals; wherein an orthographic projection of one first transistor on the base substrate is located in one first partition, and an orthographic projection of one second transistor on the base substrate is located in one second partition;
gates of the first transistors in one row of sub-pixels are electrically connected to a same first gate line;
gates of the second transistors in one row of sub-pixels are electrically connected to a same second gate line;
first electrodes of the first transistors and first electrodes of the second transistors in one column of sub-pixels are electrically connected to a same data line;
in a same first partition, a second electrode of the first transistor is electrically connected to the first reflective electrode; and
in a same second partition, a second electrode of the second transistor is electrically connected to the second reflective electrode.

12. The display panel according to claim 11, wherein an orthographic projection of the first through hole on the base substrate does not overlap an orthographic projection of the source conductive layer on the base substrate and an orthographic projection of the gate conductive layer on the base substrate respectively; and
an orthographic projection of the second through hole on the base substrate does not overlap the orthographic projection of the source conductive layer on the base substrate and the orthographic projection of the gate conductive layer on the base substrate respectively.

13. The display panel according to claim 11, wherein the gate conductive layer further comprises a plurality of third gate lines disposed at intervals; the display panel further comprises: a plurality of third transistors disposed at intervals; an orthographic projection of one third transistor on the base substrate is located in one sub-pixel;
gates of the third transistors in one row of sub-pixels are electrically connected to a same third gate line; and
in the same sub-pixel, the first transistor and the second transistor are electrically connected with a source connection portion through the third transistor.

14. The display panel according to claim 13, wherein the source conductive layer further comprises: a plurality of source connection portions; and
the source connection portions comprise: first sub-source connection portions and second sub-source connection portions electrically connected to each other; wherein the first sub-source connection portions extend in the first direction, and the second sub-source connection portions extend in a second direction; and the first sub-source connection portions are electrically connected to the data lines, and the second sub-source connection portions are electrically connected to the third transistors.

15. The display panel according to claim 14, wherein an orthographic projection of a first sub-through hole on the base substrate is located between an orthographic projection of the first sub-source connection portions on the base substrate and an orthographic projection of the data lines on the base substrate, and the orthographic projection of the first sub-through hole on the base substrate is located between an orthographic projection of the second sub-source connection portions on the base substrate and an orthographic projection of the third gate lines on the base substrate.

16. The display panel according to claim 1, wherein the display panel further comprises: a transparent conductive layer, located on a side of the reflective electrode facing away from the base substrate;
the transparent conductive layer comprises a plurality of first sub-transparent conductive portions disposed at intervals; an orthographic projection of one first sub-transparent conductive portion on the base substrate is located in one first partition; and
in the same first partition, an orthographic projection of a first sub-transparent conductive portion on the base substrate covers an orthographic projection of the first through hole on the base substrate, and the orthographic projection of the first sub-transparent conductive portion on the base substrate is located within an orthographic projection of the first reflective electrode on the base substrate.

17. The display panel according to claim 16, wherein the transparent conductive layer comprises a plurality of second sub-transparent conductive portions disposed at intervals; an orthographic projection of one second sub-transparent conductive portion on the base substrate is located in one second partition; and
in the same second partition, an orthographic projection of a second sub-transparent conductive portion on the base substrate covers an orthographic projection of the second through hole on the base substrate, and the orthographic projection of the second sub-transparent conductive portion on the base substrate is located within an orthographic projection of the second reflective electrode on the base substrate.

18. A driving method of the display panel according to claim 1, comprising:
driving a row of sub-pixels in each data input stage of one frame of time;

wherein driving the row of sub-pixels in one data writing stage, comprises:

loading a gate opening signal on a first gate line electrically connected to the row of sub-pixels, loading a gate closing signal on a second gate line electrically connected to the row of sub-pixels, and loading a data signal on each data line so as to make a first reflective electrode in the row of sub-pixels input the data signal; and loading the gate closing signal on the first gate line electrically connected to the row of sub-pixels, loading the gate opening signal on the second gate line electrically connected to the row of sub-pixels, and loading the data signal on each data line so as to make a second reflective electrode in the row of sub-pixels input the data signal.

19. The driving method according to claim 18, wherein while loading the gate opening signal on the first gate line electrically connected to the row of sub-pixels, the method further comprises: loading the gate opening signal on a third gate line electrically connected to the row of sub-pixels; or, while loading the gate opening signal on the second gate line electrically connected to the row of sub-pixels, the method further comprises: loading the gate opening signal to the third gate line electrically connected to the row of sub-pixels.

20. A display device, comprising a display panel, wherein the display panel comprises:

a base substrate; and a plurality of sub-pixels, disposed on the base substrate, at least one of the plurality of sub-pixels comprising a reflective electrode;

wherein the reflective electrode comprises at least a first reflective electrode and a second reflective electrode insulated and spaced apart from each other, the first reflective electrode is provided with a first through hole, the second reflective electrode is provided with a second through hole;

wherein the base substrate has a first partition and a second partition, an orthographic projection of the first reflective electrode on the base substrate is located in the first partition, and an orthographic projection of the second reflective electrode on the base substrate is located in the second partition; and the display panel further comprises:

an opposite substrate, disposed opposite to the base substrate; and a color resist layer, located between the base substrate and the opposite substrate, and comprising a sub-color resist layer located in each sub-pixel;

wherein the sub-color resist layer comprises a first sub-color resist region and a second sub-color resist region, and in a direction perpendicular to a plane where the base substrate is located, the first partition covers the first sub-color resist region, and the second partition covers the second sub-color resist region;

wherein the sub-color resist layer located in the first partition is provided with a first via hole, and the first via hole penetrates through the sub-color resist layer; and an orthographic projection of the first via hole on the base substrate and an orthographic projection of the first through hole on the base substrate do not overlap.

\* \* \* \* \*